(12) United States Patent
Hirota

(10) Patent No.: US 11,388,300 B2
(45) Date of Patent: *Jul. 12, 2022

(54) APPLIANCE SETTING APPARATUS AND NON-TRANSITORY COMPUTER-READABLE RECORDING MEDIUM STORING APPLIANCE SETTING PROGRAM

(71) Applicant: KYOCERA Document Solutions Inc., Osaka (JP)

(72) Inventor: Masato Hirota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,308

(22) Filed: Jun. 18, 2021

(65) Prior Publication Data

US 2021/0314455 A1 Oct. 7, 2021

Related U.S. Application Data

(63) Continuation of application No. 16/907,493, filed on Jun. 22, 2020, now Pat. No. 11,070,691.

(30) Foreign Application Priority Data

Jun. 27, 2019 (JP) .............................. JP2019-119761

(51) Int. Cl.
*H04N 1/00* (2006.01)
*G06F 3/12* (2006.01)

(52) U.S. Cl.
CPC ....... *H04N 1/00503* (2013.01); *G06F 3/1208* (2013.01); *G06F 3/1275* (2013.01); *H04N 1/00474* (2013.01); *H04N 1/00509* (2013.01)

(58) Field of Classification Search
CPC .......... H04N 1/00503; H04N 1/00474; H04N 1/00509; G06F 3/1275; G06F 3/1208
USPC ........................................................ 358/1.15
See application file for complete search history.

(56) References Cited

U.S. PATENT DOCUMENTS

2004/0153530 A1* 8/2004 Machida ............... H04L 69/329
709/220
2012/0144329 A1* 6/2012 Sasaki ................. G06F 9/44505
715/764

FOREIGN PATENT DOCUMENTS

JP 2012-124605 6/2012

* cited by examiner

*Primary Examiner* — Neil R McLean
(74) *Attorney, Agent, or Firm* — Lex IP Meister, PLLC

(57) ABSTRACT

Provided is an appliance setting apparatus. If generating layout information indicating a layout of a screen of a client application program for providing, by an image forming apparatus, a function of a document processing flow execution system, when a flow execution button for executing a document processing flow is arranged in the layout, the appliance setting apparatus acquires a list of document processing flows from the document processing flow execution system, displays at least a part of the document processing flows included in the acquired list onto the display unit, associates the document processing flow selected via an operating unit from among the displayed workflows, with the flow execution button, and installs the generated layout information on the image forming apparatus.

8 Claims, 18 Drawing Sheets

FIG. 6

44c DEVICE MANAGEMENT INFORMATION

| DISPLAY NAME | SERIAL NUMBER | IP ADDRESS | HOSTNAME | GROUP | ... |
|---|---|---|---|---|---|
| ECOSYS M8124cidn | ZXV71000015 | 10.183.50.160 | KM4B95B2 | Department A | ... |
| TASKalfa 3051ci | Z882Y00013 | 10.183.51.32 | KM99334D | Department A | ... |
| TASKalfa 3253ci | Z882Y70027 | 10.183.51.152 | KM765432 | | ... |
| ECOSYS M8130cidn | ZXV71800010 | 10.183.50.234 | KM234567 | Department B | ... |
| ... | | | | ... | ... |

APPLIANCE SETTING APPARATUS AND NON-TRANSITORY COMPUTER-READABLE RECORDING MEDIUM STORING APPLIANCE SETTING PROGRAM

INCORPORATION BY REFERENCE

This application is a continuation of U.S. patent application Ser. No. 16/907,493, filed on Jun. 22, 2020, which is based upon, and claims the benefit of priority from, corresponding Japanese Patent Application No. 2019-119761 filed in the Japan Patent Office on Jun. 27, 2019, the entire contents of which are incorporated herein by reference.

BACKGROUND

Field of the Invention

The present disclosure relates to an appliance setting apparatus for adding a button to a screen of an electronic appliance and a non-transitory computer-readable recording medium storing an appliance setting program.

Description of the Related Art

Conventionally, there is known an image forming apparatus capable of customizing screen buttons.

However, such a conventional image forming apparatus has a problem that a button for executing a workflow by a workflow execution system that executes a workflow cannot be added to a screen.

SUMMARY

An appliance setting apparatus of the present disclosure includes a display device, an operation device, a layout generation unit configured to generate layout information indicating a layout of a screen of an application program for providing, by an electronic appliance, a function of a workflow execution system configured to execute a workflow, and a layout installation unit configured to install the layout information generated by the layout generation unit on the electronic appliance, in which the layout includes a button for realizing a function executed by the electronic appliance, and if a flow execution button being the button for executing the workflow is arranged in the layout, where the workflow includes a plurality of the workflows, the layout generation unit acquires a list of the workflows from the workflow execution system, displays at least a part of the workflows included in the acquired list on the display device, and associates the workflow selected via the operation device from the workflows displayed on the display device with the flow execution button.

In the appliance setting apparatus of the present disclosure, it may be possible that the flow execution button includes a plurality of the flow execution buttons, and the layout generation unit displays the workflows included in the list onto the display device in a state where the workflow already associated with any one of the flow execution buttons already arranged in the layout is excluded.

In the appliance setting apparatus of the present disclosure, it may be possible that the electronic appliance stores device setting information indicating a setting value of a setting item of the electronic appliance, the appliance setting apparatus includes a storage unit configured to store setting value information indicating a setting value applied to the device setting information, and when installing the layout information on the electronic appliance, the layout installation unit updates the device setting information of the electronic appliance with a setting value indicated in the setting value information stored in the storage unit.

In the appliance setting apparatus of the present disclosure, it may be possible that the storage unit stores authentication and authorization utilization presence-or-absence information indicating presence or absence of a utilization of a function of an authentication and authorization system configured to authenticate and authorize a user, the storage unit stores, as the setting value information, authentication and authorization utilization setting value information indicating a setting value suitable for the electronic appliance to utilize the function of the authentication and authorization system and authentication and authorization non-utilization setting value information indicating a setting value suitable for the electronic appliance not to utilize the function of the authentication and authorization system, and the layout installation unit updates the device setting information with the setting value indicated in the authentication and authorization utilization setting value information if the authentication and authorization utilization presence-or-absence information indicates that the function of the authentication and authorization system is utilized, and updates the device setting information with the setting value indicated in the authentication and authorization non-utilization setting value information if the authentication and authorization utilization presence-or-absence information indicates that the function of the authentication and authorization system is not utilized.

In the appliance setting apparatus of the present disclosure, the layout installation unit may install identical layout information on a plurality of the electronic appliances in a batch.

In the appliance setting apparatus of the present disclosure, the layout generation unit may change at least one of an image of an icon in the button, a color of a background area of the icon in the button, and a name displayed in a name area for displaying the name of the button in the button, from a default state.

A non-transitory computer-readable recording medium of the present disclosure stores an appliance setting program executed by a computer including a display device and an operation device, the appliance setting program causing the computer to execute a layout generation unit configured to generate layout information indicating a layout of a screen of an application program for providing, by an electronic appliance, a function of a workflow execution system configured to execute a workflow, and a layout installation unit configured to install the layout information generated by the layout generation unit on the electronic appliance, in which the layout includes a button for realizing a function executed by the electronic appliance, and if a flow execution button being the button for executing the workflow is arranged in the layout, where the workflow includes a plurality of the workflows, the layout generation unit acquires a list of the workflows from the workflow execution system, displays at least a part of the workflows included in the acquired list on the display device, and associates the workflow selected via the operation device from the workflows displayed on the display device with the flow execution button.

BRIEF DESCRIPTION OF THE DRAWINGS

FIG. 6 is a table showing an example of device management information illustrated in FIG. 5;

DETAILED DESCRIPTION

Embodiments of the present disclosure will be described below with reference to the drawings.

First, a configuration of a document processing system according to an embodiment of the present disclosure will be described.

Figure 1:
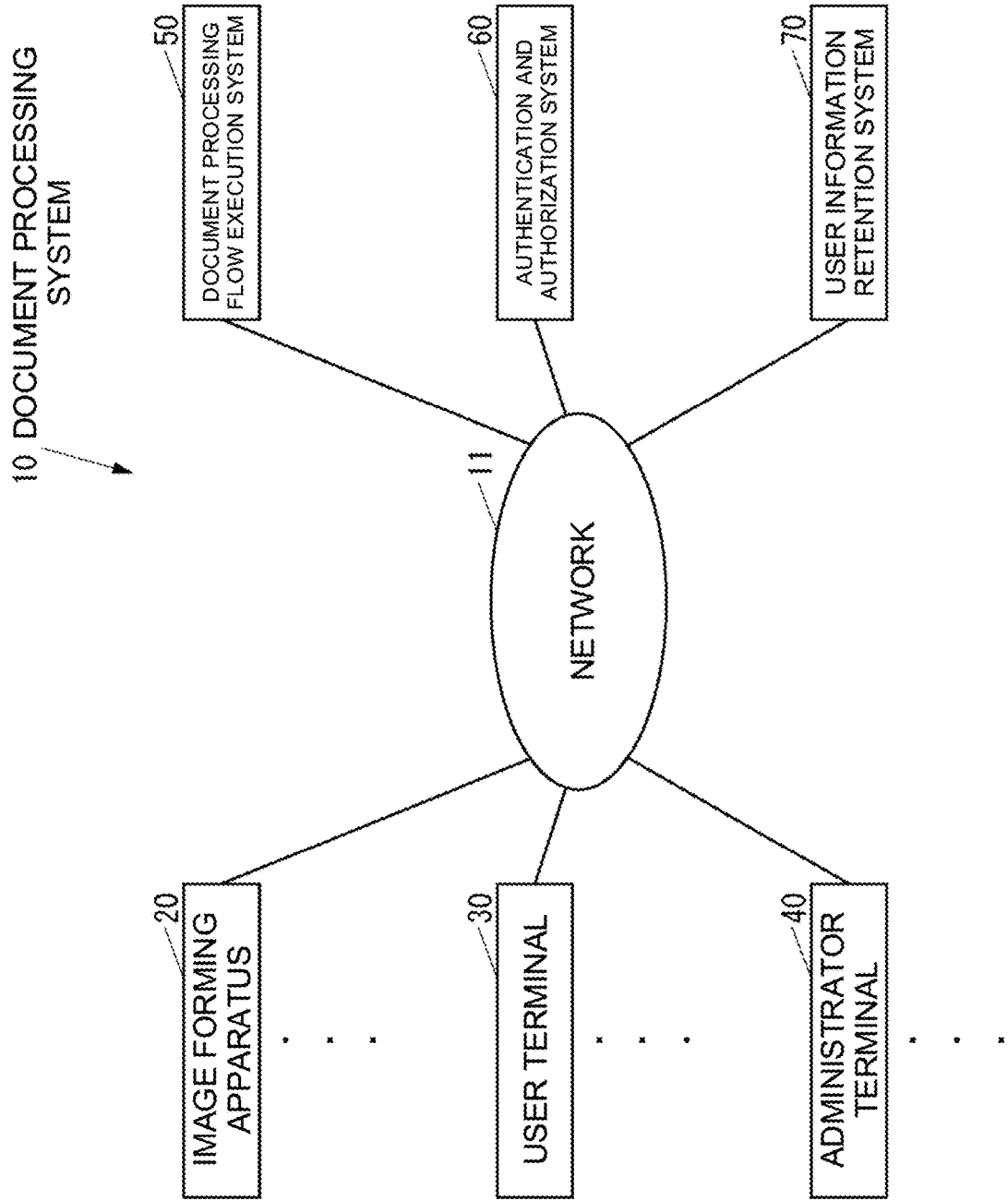
FIG. 1 is a block diagram of a document processing system according to an embodiment of the present disclosure.

FIG. 1 is a block diagram of a document processing system 10 according to the present embodiment.

As illustrated in FIG. 1, the document processing system 10 includes an image forming apparatus 20 serving as an electronic appliance. The document processing system 10 may include, in addition to the image forming apparatus 20, at least one image forming apparatus configured in much the same way as in the image forming apparatus 20. The image forming apparatus in the document processing system 10 includes, for example, a multifunction peripheral (MFP), and a scanner-only machine.

The document processing system 10 includes a user terminal 30 used by a user of the document processing system 10. The document processing system 10 may include, in addition to the user terminal 30, at least one user terminal configured in much the same way as in the user terminal 30. The user terminal in the document processing system 10 includes, for example, a computer such as a personal computer (PC).

The document processing system 10 includes an administrator terminal 40 used by an administrator on a user side of the document processing system 10 (hereinafter, simply referred to as "administrator"). The document processing system 10 may include, in addition to the administrator terminal 40, at least one administrator terminal configured in much the same way as in the administrator terminal 40. The administrator terminal in the document processing system 10 includes, for example, a computer such as a PC.

The document processing system 10 includes a document processing flow execution system 50 serving as a workflow execution system configured to execute a document processing flow being a processing workflow of a document. The document processing flow execution system 50 may be configured by one or more computers. The document processing flow executed by the document processing flow execution system 50 includes an input stage in which a document is input, a document processing stage in which various processes are executed on the input document, and an output stage in which a result of the processes executed in the document processing stage is output. Examples of a method of inputting a document in the input stage include various methods such as a method of inputting, as a document, an image read from an original by a scanner of an image forming apparatus, a method of inputting a document saved in a certain folder, and a method of inputting a document attached to a received e-mail. Examples of processes executed on the document in the document processing stage include various processes such as an optical character recognition (OCR) process for generating a text from an image as a document, a process for executing a certain correction such as a tilt correction on an image as a document, and a process for converting a format of an image as a document. Examples of a method of outputting a result of the processes in the output stage include various methods such as a method of outputting a result to a certain folder, and a method of transmitting a result to a certain destination by e-mail. The document processing flow execution system 50 may save a plurality of document processing flows. For example, the document processing flow execution system 50 may save a new document processing flow in response to an instruction from an administrator terminal, and may also change or delete an already stored document processing flow in response to an instruction from an administrator terminal.

The document processing system 10 includes an authentication and authorization system 60 configured to authenticate and authorize a user of the document processing system 10. The authentication and authorization system 60 may be configured by one or more computers. The authentication and authorization system 60 manages restrictions on utilization of various types of functions of the image forming apparatus for each user, and may provide, to the image forming apparatus and the document processing flow execution system 50, authorization information indicating restrictions on utilization of various types of functions of the image forming apparatus related to an authenticated user, that is, a user logged in to the image forming apparatus. For example, the authentication and authorization system 60 may spool print data transmitted from a user terminal, or output the spooled print data to any image forming apparatus. The authentication and authorization system 60 may also manage utilization of the image forming apparatus by a user of the document processing system 10.

The document processing system 10 includes a user information retention system 70 configured to retain information of a user of the document processing system 10. The user information retention system 70 may be configured by one or more computers. Examples of the user information retained by the user information retention system 70 include a user name, an account name, and an email address. The user information retention system 70 provides the user information to at least one of the document processing flow execution system 50 and the authentication and authorization system 60, as necessary.

It is possible to communicably connect the image forming apparatus, the user terminal, and the administrator terminal in the document processing system 10 with the document processing flow execution system 50, the authentication and authorization system 60, and the user information retention system 70 via a network 11 such as a local area network (LAN).

If a user requests to log in from the image forming apparatus, the document processing flow execution system 50 inquires the authentication and authorization system 60 about whether the user is logged in to the image forming apparatus.

Figure 2:
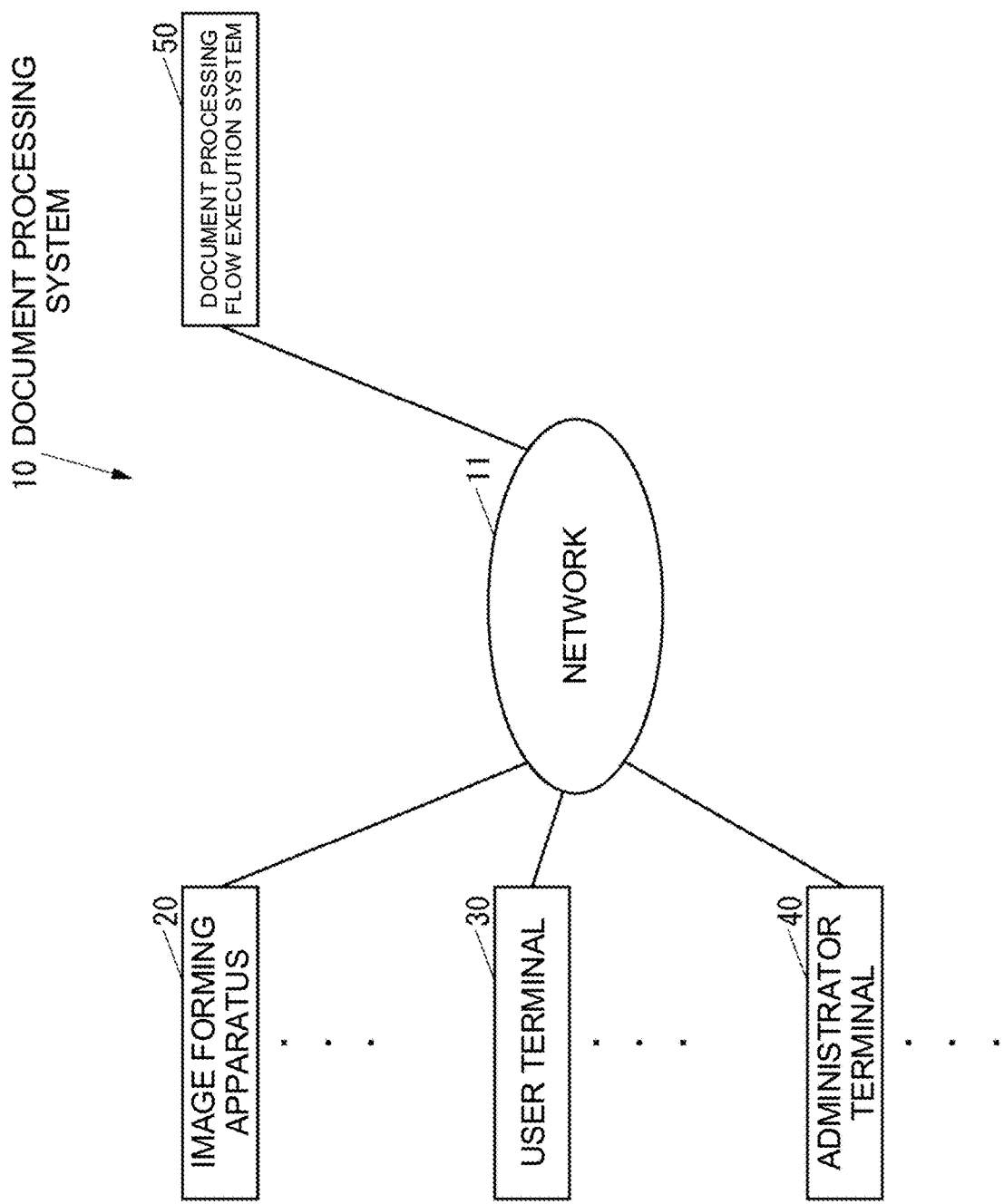
FIG. 2 is a block diagram of a document processing system in an example different from an example illustrated in FIG. 1.

FIG. 2 is a block diagram of the document processing system 10 in an example different from the example illustrated in FIG. 1.

As illustrated in FIG. 2, the document processing system 10 may be configured without the authentication and authorization system 60 (see FIG. 1) and the user information retention system 70 (see FIG. 1).

Figure 3:
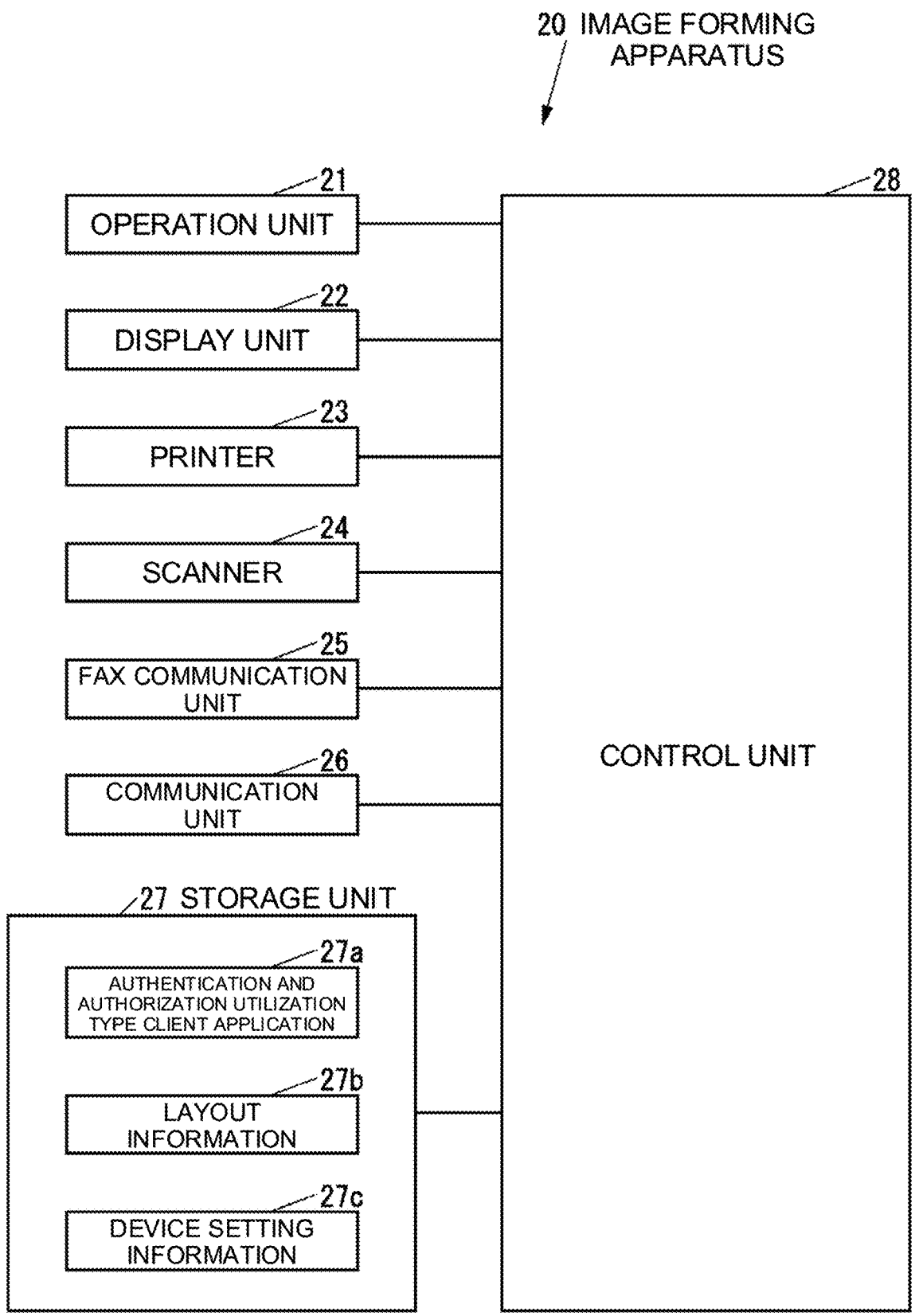
FIG. 3 is a block diagram of an image forming apparatus illustrated in FIG. 1 when the image forming apparatus is configured by an MFP.

FIG. 3 is a block diagram of the image forming apparatus 20 when the image forming apparatus is configured by an MFP.

As illustrated in FIG. 3, the image forming apparatus 20 includes: an operation unit 21 being an input device, such as a button, through which various operations are input; a display unit 22 being a display device, such as a liquid crystal display (LCD), configured to display various information; a printer 23 being a printing device configured to print an image on a recording medium such as a sheet; a scanner 24 being a reading device configured to read an image from an original; a fax communication unit 25 being a fax device configured to perform fax communication via a communication line such as a public telephone line with an external facsimile device (not illustrated); a communication unit 26 being a communication device configured to perform communication with an external device via a network such as a LAN or the Internet, or directly by wire or wirelessly without going through the network; a storage unit 27 being a non-volatile storage device, such as a semiconductor memory or a hard disk device (HDD), configured to store various types of information; and a control unit 28 configured to control the entire image forming apparatus 20.

The storage unit 27 may store an authentication and authorization utilization type client application 27a being a client application program for providing a user with functions of the document processing flow execution system 50 (see FIG. 1) and the authentication and authorization system 60 (see FIG. 1). The authentication and authorization utilization type client application 27a may be installed on the image forming apparatus 20, for example, when the image forming apparatus 20 is manufactured, may be additionally installed on the image forming apparatus 20 from an external storage medium such as a universal serial bus (USB) memory, or may be additionally installed on the image forming apparatus 20 through a network.

The storage unit 27 may store layout information 27b indicating a layout of a screen of the client application program (hereinafter, referred to as the "application screen layout").

The storage unit 27 may store device setting information 27c indicating setting values of various types of setting items of the image forming apparatus 20. Examples of the setting items indicated in the device setting information 27c may include: a "panel reset time period" indicating, if no operations are input to the operation unit 21 continuously for a certain time period, a continuous time period during which no operations are input to the operation unit 21 for executing a panel reset to display a default screen on the display unit 22; a "sleep transition time period" indicating, if no operations are input to the operation unit 21 continuously for a certain time period, a continuous time period during which no operations are input to the operation unit 21 for executing a sleep transition to transit the image forming apparatus 20 to a sleep state; and a "print output-source IP address" indicating from which device receives print data, by an Internet Protocol (IP) address of the device. If the "panel reset time period" and the "sleep transition time period" are set to have an appropriate time period, the possibility of a user getting logged out because of the panel reset and sleep transition, for example, while the user uses the image forming apparatus, can be reduced. If the "print output-source IP address" is set to receive print data, for example, from only the authentication and authorization system 60, the possibility of the image forming apparatus performing printing based on print data from a device not managed by the administrator can be reduced.

It is possible to designate the setting values indicated in the device setting information 27c from a system menu of the image forming apparatus 20 via the operation unit 21. However, various types of setting items indicated in the device setting information 27c are scattered in the system menu of the image forming apparatus 20 because of which a lot of working time and labor are required for designating setting values of all setting items indicated in the device setting information 27c from the system menu of the image forming apparatus 20 via the operation unit 21.

The control unit 28 includes, for example, a central processing unit (CPU), a read only memory (ROM) storing programs and various types of data, and a random access memory (RAM) being a memory serving as a volatile storage device used as a work area of the CPU of the control unit 28. The CPU of the control unit 28 executes a program stored in the storage unit 27 or in the ROM of the control unit 28.

If executing the authentication and authorization utilization type client application 27a, the control unit 28 is capable of restricting, in accordance with authorization information acquired from the authentication and authorization system 60, utilization of various types of functions of the image forming apparatus 20 such as "scanning" for reading images from an original by the scanner 24, "print output" for printing, on a recording medium by the printer 23, various images such as images based on print data received via the communication unit 26, "copying" for printing, on a recording medium by the printer 23, an image read from an original by the scanner 24, and "fax transmission" for transmitting, through fax communication by the fax communication unit 25, an image read from an original by the scanner 24.

Figure 4:
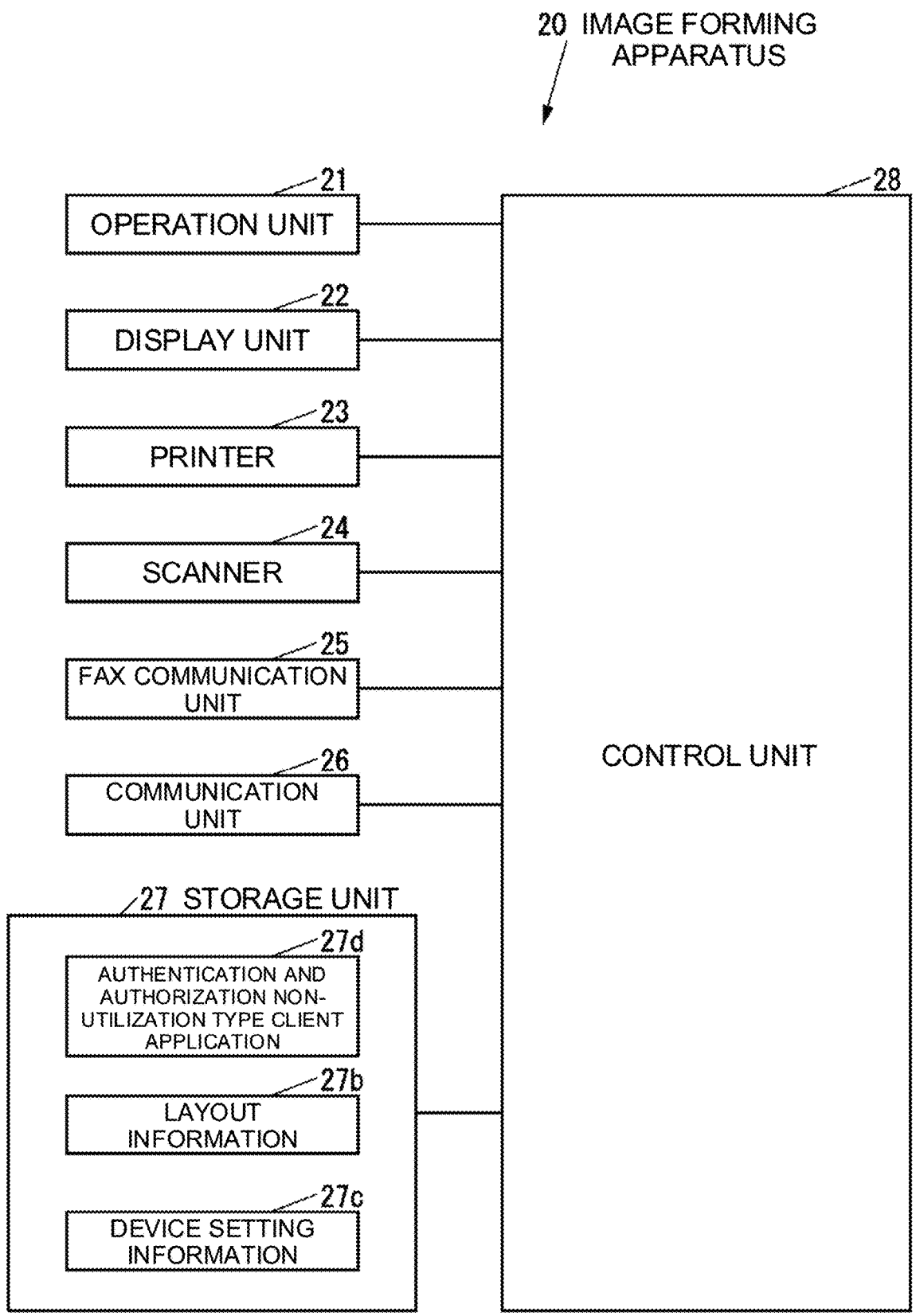
FIG. 4 is a block diagram of an image forming apparatus in an example different from an example illustrated in FIG. 3.

FIG. 4 is a block diagram of the image forming apparatus 20 in an example different from the example illustrated in FIG. 3.

As illustrated in FIG. 4, the image forming apparatus 20 may store, in the storage unit 27, an authentication and authorization non-utilization type client application 27d being a client application program for providing, to a user, functions of only the document processing flow execution system 50 out of the document processing flow execution system 50 (see FIG. 1) and the authentication and authorization system 60 (see FIG. 1), instead of the authentication and authorization utilization type client application 27a (see FIG. 3). The authentication and authorization non-utilization type client application 27d may be installed on the image forming apparatus 20, for example, when the image forming apparatus 20 is manufactured, may be additionally installed on the image forming apparatus 20 from an external storage medium such as a USB memory, or may be additionally installed on the image forming apparatus 20 through a network.

Figure 5:
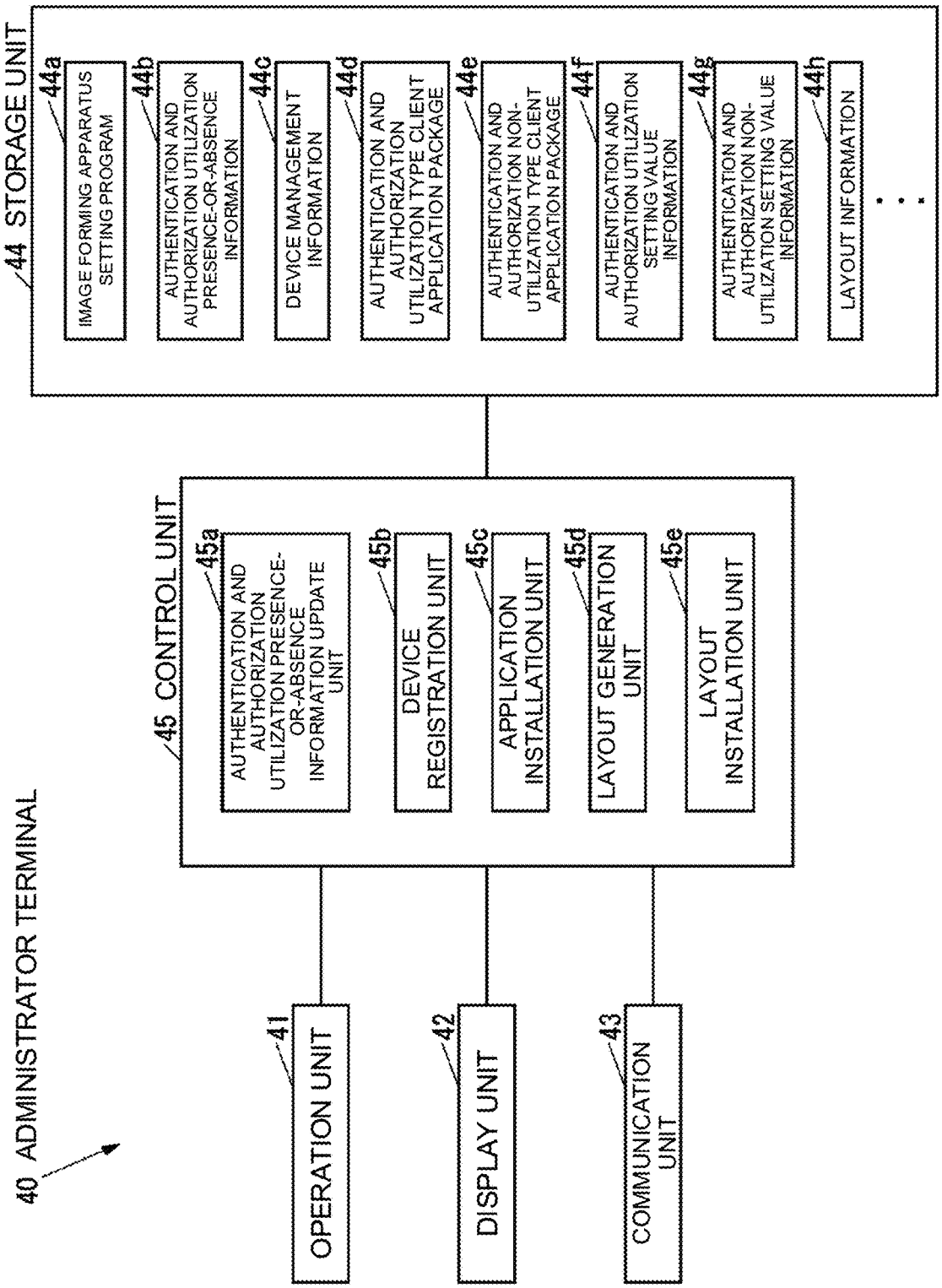
FIG. 5 is a block diagram of an administrator terminal illustrated in FIG. 1.

FIG. 5 is a block diagram of the administrator terminal 40.

As illustrated in FIG. 5, the administrator terminal 40 includes an operation unit 41 being an operation device, such as a keyboard or a mouse, through which various operations are input; a display unit 42 being a display device, such as an LCD, configured to display various information; a communication unit 43 being a communication device configured to communicate with an external device via a network such as a LAN or the Internet, or directly by wire or wirelessly without going through a network; a storage unit 44 being a non-volatile storage device; such as a semiconductor memory or an HDD, configured to store various types of information; and a control unit 45 configured to control the entire administrator terminal 40.

The storage unit 44 stores an image forming apparatus setting program 44a being an appliance setting program for setting a screen of the image forming apparatus being an electronic appliance. The image forming apparatus setting program 44a may be installed on the administrator terminal 40, for example, when the administrator terminal 40 is manufactured, may be additionally installed on the administrator terminal 40 from an external storage medium such as a compact disk (CD), a digital versatile disk (DVD), and a USB memory, or may be additionally installed on the administrator terminal 40 through a network.

The storage unit 44 stores authentication and authorization utilization presence-or-absence information 44b indicating presence or absence of utilization of a function of the authentication and authorization system 60 (see FIG. 1). The authentication and authorization utilization presence-or-absence information 44b indicates that the function of the authentication and authorization system 60 is not utilized by default, for example.

The storage unit 44 stores device management information 44c indicating an image forming apparatus managed in the image forming apparatus setting program 44a.

FIG. 6 is a table showing an example of the device management information 44c.

The device management information 44c shown in FIG. 6 indicates a display name of the image forming apparatus (Display name), a serial number of the image forming apparatus (Serial number), an IP address of the image forming apparatus (IP address), a host name of the image forming apparatus (Host name), and a group to which the image forming apparatus belongs (Group), for each image forming apparatus.

As illustrated in FIG. 5, the storage unit 44 stores an authentication and authorization utilization type client application package 44d being an installation package for an authentication and authorization utilization type client application, and an authentication and authorization non-utilization type client application package 44e being an installation package for an authentication and authorization non-utilization type client application.

The storage unit 44 stores, as a setting value to be applied to device setting information of the image forming apparatus, authentication and authorization utilization setting value information 44f indicating a setting value suitable for the image forming apparatus to utilize a function of the authentication and authorization system 60, and as a setting value to be applied to the device setting information of the image forming apparatus, authentication and authorization non-utilization setting value information 44g indicating a setting value suitable for the image forming apparatus not to utilize a function of the authentication and authorization system 60.

The storage unit 44 may store layout information 44h indicating an application screen layout. The storage unit 44 may store layout information indicating an application screen layout in addition to the layout information 44h.

The control unit 45 includes, for example, a CPU, a ROM storing programs and various types of data, and a RAM serving as a memory used as a work area of the CPU of the control unit 45. The CPU of the control unit 45 executes a program stored in the storage unit 44 or in the ROM of the control unit 45.

As a result of executing the image forming apparatus setting program 44a, the control unit 45 realizes an authentication and authorization utilization presence-or-absence information update unit 45a configured to update the authentication and authorization utilization presence-or-absence information 44b, a device registration unit 45b configured to register the image forming apparatus with the device management information 44c, an application installation unit 45c configured to install a client application program on the image forming apparatus, a layout generation unit 45d configured to generate layout information indicating an application screen layout, and a layout installation unit 45e configured to install layout information on the image forming apparatus. That is, the administrator terminal 40 configures an appliance setting apparatus for setting a screen of the image forming apparatus being an electronic appliance.

Figure 7:
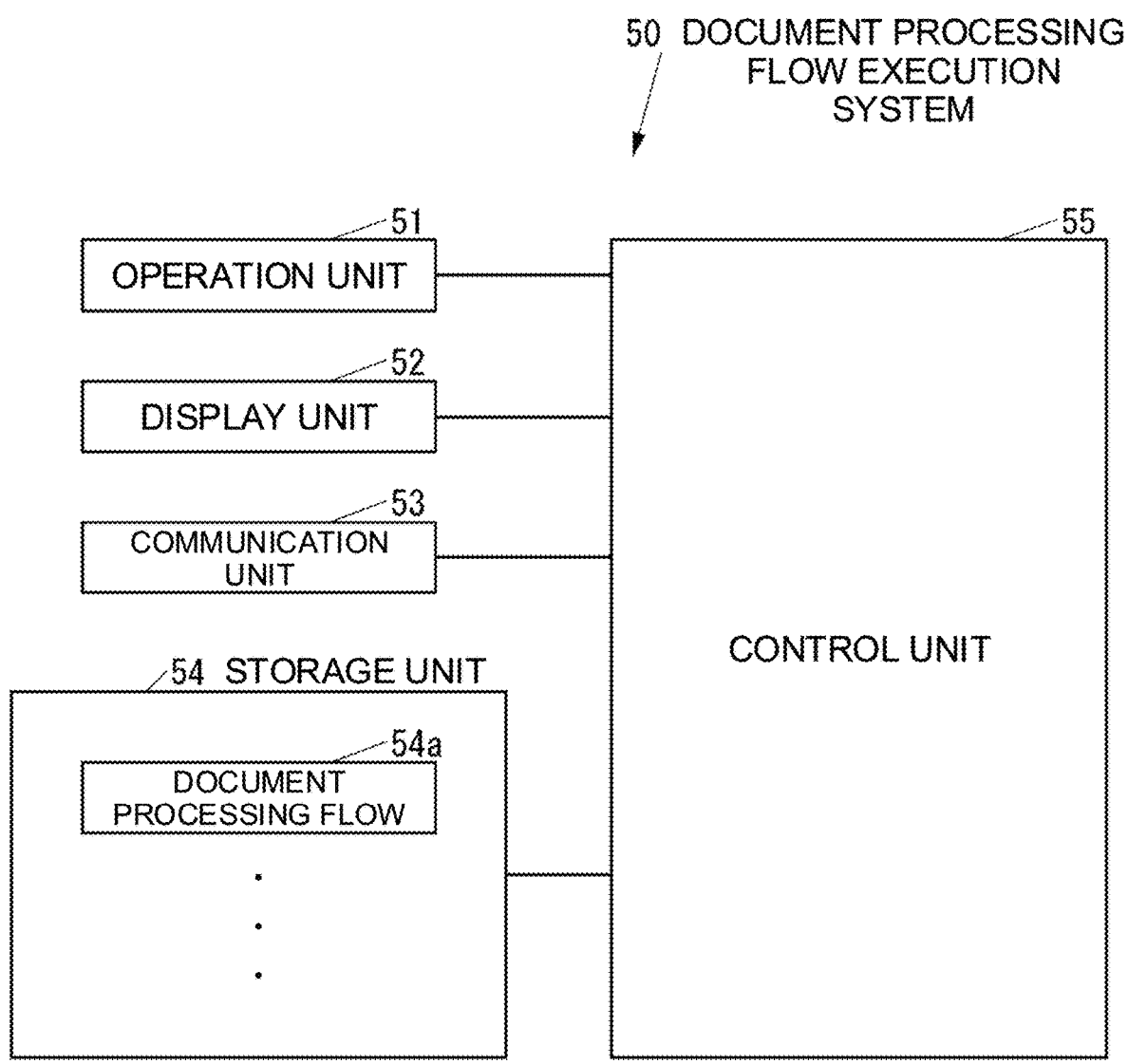
FIG. 7 is a block diagram of a document processing flow execution system illustrated in FIG. 1 when the document processing flow execution system is configured by one computer.

FIG. 7 is a block diagram of the document processing flow execution system 50 when the document processing flow execution system 50 is configured by one computer.

As illustrated in FIG. 7, the document processing flow execution system 50 includes an operation unit 51 being an operation device, such as a keyboard or a mouse, through which various operations are input, a display unit 52 being a display device, such as an LCD, configured to display various information, a communication unit 53 being a communication device configured to communicate with an external device via a network such as a LAN or the Internet, or directly by wire or wirelessly without going through a network, a storage unit 54 being a non-volatile storage device, such as a semiconductor memory or an HDD, configured to store various types of information, and a control unit 55 configured to control the entire document processing flow execution system 50.

The storage unit 54 may store a document processing flow 54a. The storage unit 54 may store a document processing flow in addition to the document processing flow 54a. In the document processing flow, a display name by which a user identifies the document processing flow is set, and a flow ID being identification information for distinguishing the document processing flow from other document processing flows is assigned. The display name of the document processing flow may be set, for example, according to an instruction from the administrator terminal.

The control unit 55 includes, for example, a CPU, a ROM storing programs and various types of data, and a RAM serving as a memory used as a work area of the CPU of the control unit 55. The CPU of the control unit 55 executes a program stored in the storage unit 54 or in the ROM of the control unit 55.

Next, an operation of the document processing system 10 will be described.

First, an operation of the administrator terminal 40 when the authentication and authorization utilization presence-or-absence information 44b is updated will be described.

Figure 8:
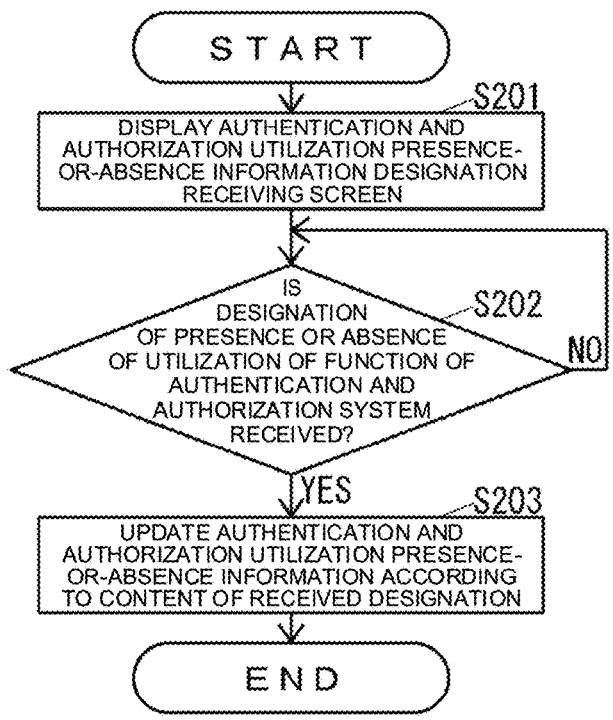
FIG. 8 is a flowchart of an operation of the administrator terminal illustrated in FIG. 5 when authentication and authorization utilization presence-or-absence information is updated.

FIG. 8 is a flowchart of an operation of the administrator terminal 40 when the authentication and authorization utilization presence-or-absence information 44b is updated.

If being instructed via the operation unit 41 to start a process of updating the authentication and authorization utilization presence-or-absence information 44b, the authentication and authorization utilization presence-or-absence information update unit 45a of the administrator terminal 40 executes the operation illustrated in FIG. 8.

As illustrated in FIG. 8, the authentication and authorization utilization presence-or-absence information update unit 45a displays, on the display unit 42, an authentication and authorization utilization presence-or-absence designation receiving screen for receiving a designation of presence or absence of utilization of a function of the authentication and authorization system 60 (S201). Here, the authentication and authorization utilization presence-or-absence information update unit 45a can receive a designation of presence or absence of utilization of a function of the authentication and authorization system 60 on the authentication and authorization utilization presence-or-absence designation receiving screen via the operation unit 41. For example, if the document processing system 10 includes the authentication and authorization system 60 as illustrated in FIG. 1, the administrator may designate to utilize the function of the authentication and authorization system 60, on the authentication and authorization utilization presence-or-absence designation receiving screen, and if the document processing system 10 does not include the authentication and authorization system 60 as illustrated in FIG. 2, the administrator may designate not to utilize the function of the authentication and authorization system 60, on the authentication and authorization utilization presence-or-absence designation receiving screen.

After the processing in S201, the authentication and authorization utilization presence-or-absence information update unit 45a determines, until it is determined that designation of presence or absence of utilization of the function of the authentication and authorization system 60 is received on the authentication and authorization utilization presence-or-absence designation receiving screen, whether the designation of presence or absence of utilization of the function of the authentication and authorization system 60 is received on the authentication and authorization utilization presence-or-absence designation receiving screen (S202).

If determining in S202 that the designation of presence or absence of utilization of the function of the authentication and authorization system 60 is received on the authentication and authorization utilization presence-or-absence designation receiving screen, the authentication and authorization utilization presence-or-absence information update unit 45a updates the authentication and authorization utilization presence-or-absence information 44b according to the contents of the received designation (S203), and the operation illustrated in FIG. 8 ends.

Next, an operation of the administrator terminal 40 when the image forming apparatus is registered with the device management information 44c will be described.

Figure 9:
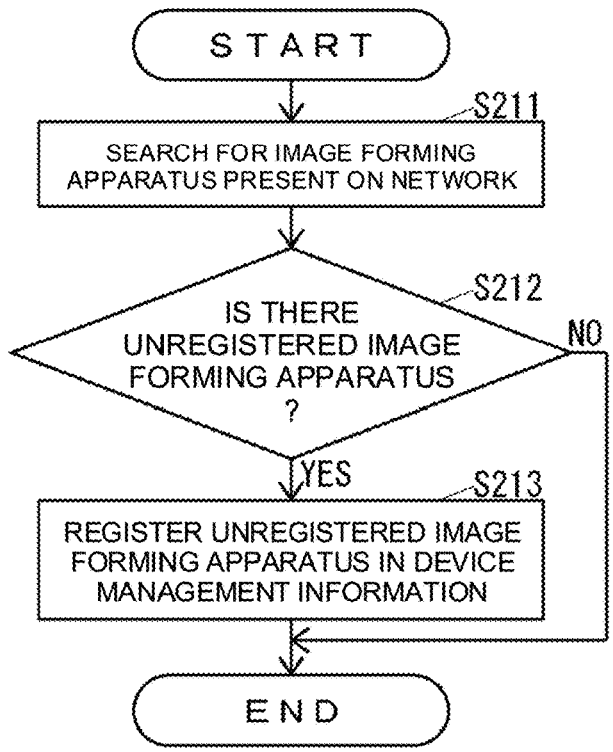
FIG. 9 is a flowchart of an operation of the administrator terminal illustrated in FIG. 5 when the image forming apparatus is registered with the device management information.

FIG. 9 is a flowchart of an operation of the administrator terminal 40 when the image forming apparatus is registered with the device management information 44c.

The device registration unit 45b of the administrator terminal 40 executes the operation illustrated in FIG. 9 at a certain timing, such as a timing at which the image forming apparatus setting program 44a is activated, or a timing at which a start of a process of registering the image forming apparatus with the device management information 44c is instructed via the operation unit 41.

As illustrated in FIG. 9, the device registration unit 45b searches for image forming apparatuses existing on the network 11 (S211).

Next, the device registration unit 45b determines whether an image forming apparatus not registered with the device management information 44c exists among the image forming apparatuses searched in S211 (S212).

If the device registration unit 45b determines in S212 that an image forming apparatus not registered with the device management information 44c does not exist among the image forming apparatuses searched in S211, the operation illustrated in FIG. 9 ends.

If determining in S212 that an image forming apparatus not registered with the device management information 44c exists among the image forming apparatuses searched in S211, the device registration unit 45b registers, with the device management information 44c, the image forming apparatus not registered with the device management information 44c among the image forming apparatuses searched in step S211 (S213), and the operation illustrated in FIG. 9 ends.

Next, an operation of the administrator terminal 40 when a group to which the image forming apparatus belongs to is updated in the device management information 44c will be described.

If being instructed via the operation unit 41 to display the device management screen 100 (see FIG. 10) for managing an image forming apparatus, the device registration unit 45b of the administrator terminal 40 displays the device management screen 100 on the display unit 42.

Figure 10:
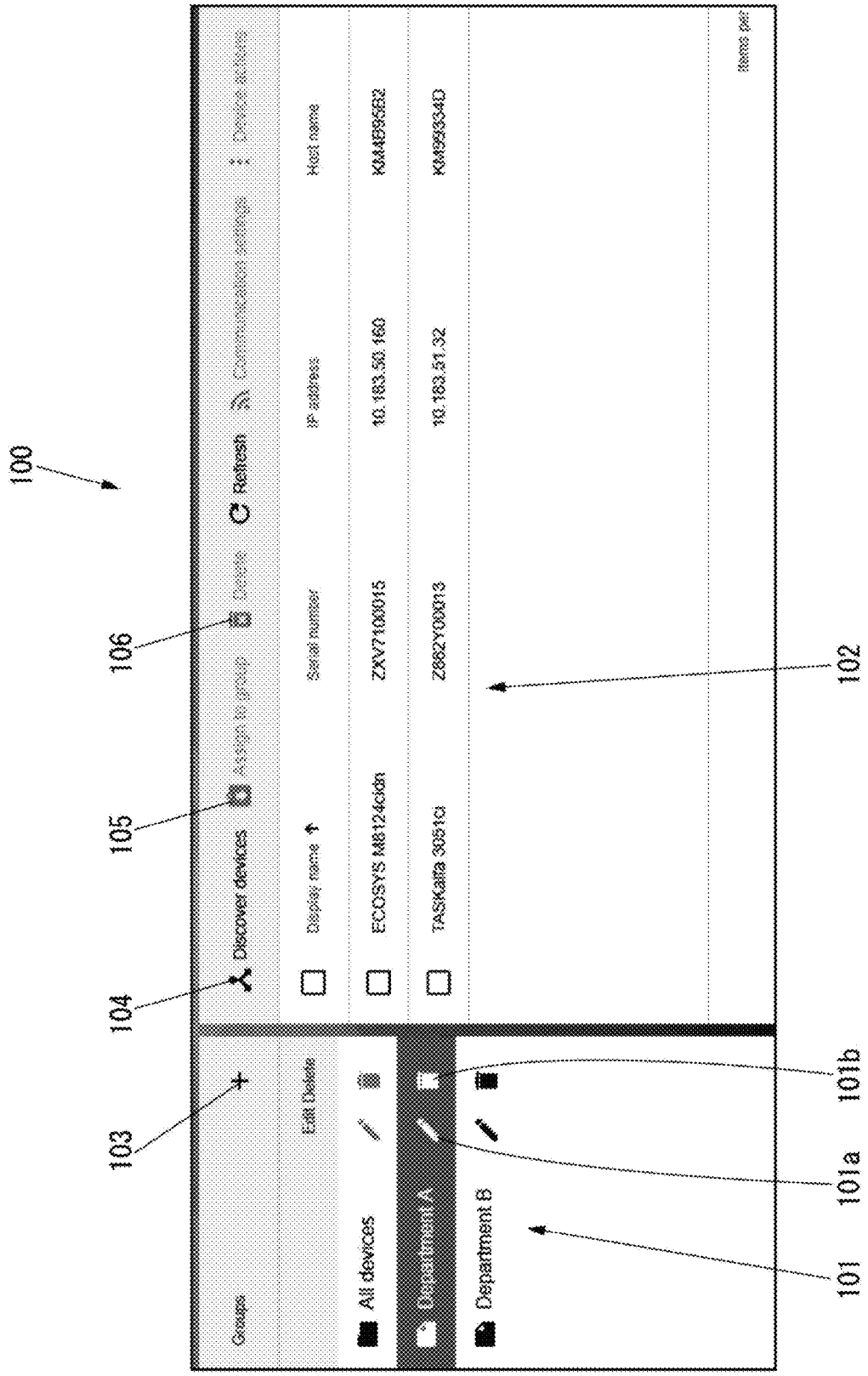
FIG. 10 is a graphic representation illustrating an example of a device management screen displayed on a display unit illustrated in FIG. 5.

FIG. 10 is a graphic representation illustrating an example of the device management screen 100.

The device management screen 100 illustrated in FIG. 10 includes a group list area 101 for displaying a list of groups to which image forming apparatuses belong; an image forming apparatus display area 102 for displaying an image forming apparatus belonging to a group designated in the group list area 101; a group addition button 103 for adding a group displayed in the group list area 101; a device registration process start button 104 for starting a process of registering an image forming apparatus with the device management information 44*c*; a group assignment button 105 for assigning an image forming apparatus designated in the image forming apparatus display area 102 to any of the groups displayed in the group list area 101, and a device deletion button 106 for deleting an image forming apparatus designated in the image forming apparatus display area 102 from the group.

In the example illustrated in FIG. 10, the group list area 101 includes "All devices" indicating all the image forming apparatuses indicated in the device management information 44*c*, and two groups namely "Department A" and "Department B". Although "All devices" is not a group, it is possible to handle "All devices" similarly to a group in the device management screen 100.

The group list area 101 includes, for all the groups, an edit button 101*a* for changing a name of the corresponding group, and a group deletion button 101*b* for deleting the corresponding group. It is not possible to rename or delete "All devices". If the edit button 101*a* is depressed, and a name of a group for which the edit button 101*a* is depressed is changed via the operation unit 41, the device registration unit 45*b* changes the name of the group in the device management information 44*c*. If the group deletion button 101*b* is depressed, the device registration unit 45*b* deletes a group for which the group deletion button 101*b* is depressed, from the group list area 101, and also cancels the association of the group with the image forming apparatus in the device management information 44*c*.

If the group addition button 103 is depressed, the device registration unit 45*b* adds, to the group list area 101, a new group to which at least one image forming apparatus designated via the operation unit 41 belongs, from among image forming apparatuses not belonging to any of the groups, and also associates the group with the image forming apparatus in the device management information 44*c*.

If "All devices" is designated in the group list area 101, the device registration unit 45*b* enables an operation on the group assignment button 105 only if only an image forming apparatus not belonging to any of the groups is designated in the image forming apparatus display area 102. If the group assignment button 105 is depressed, the device registration unit 45*b* assigns an image forming apparatus designated in the image forming apparatus display area 102 to a group designated via the operation unit 41, and also associates the group with the image forming apparatus in the device management information 44*c*.

If a group is designated in the group list area 101, the device registration unit 45*b* enables an operation on the group deletion button 106 only if an image forming apparatus is designated in the image forming apparatus display area 102. If the device deletion button 106 is operated, the device registration unit 45*b* deletes an image forming apparatus designated in the image forming apparatus display area 102 from the group at the time the device deletion button 106 is operated, and also cancels the association of the group with the image forming apparatus in the device management information 44*c*. It is noted that if, as a result of deleting an image forming apparatus from a group, there occurs a group to which no image forming apparatus belongs, the device registration unit 45*b* deletes the group from the group list area 101.

Next, an operation of the administrator terminal 40 when the client application program is installed on the image forming apparatus will be described.

Figure 11:
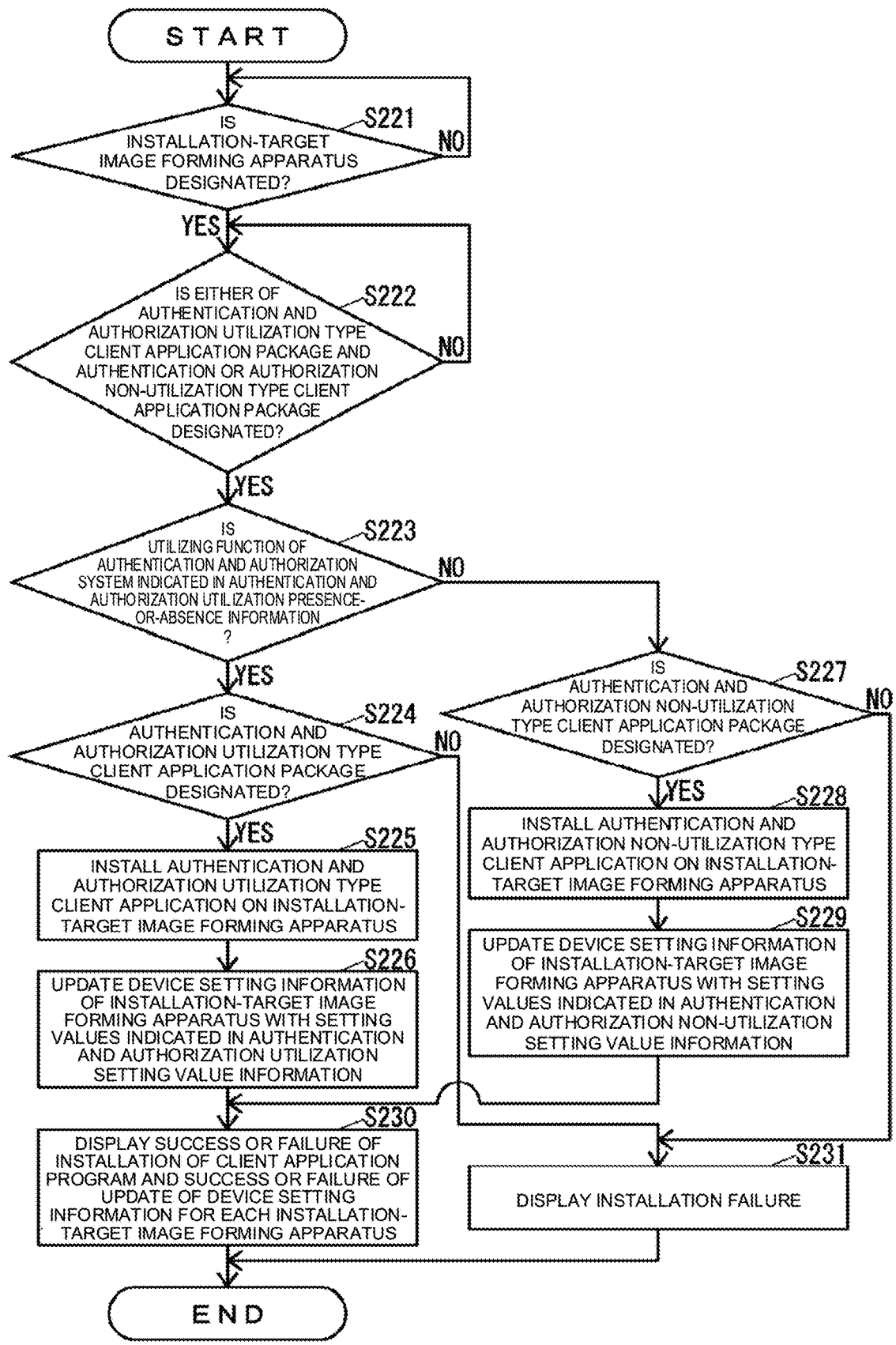
FIG. 11 is a flowchart of an operation of the administrator terminal illustrated in FIG. 5 when a client application program is installed on the image forming apparatus.

FIG. 11 is a flowchart of an operation of the administrator terminal 40 when the client application program is installed on the image forming apparatus.

If being instructed via the operation unit 41 to start a process of installing the client application program on the image forming apparatus, the application installation unit 45*c* of the administrator terminal 40 executes the operation illustrated in FIG. 11.

As illustrated in FIG. 11, the application installation unit 45*c* determines, until it is determined that an image forming apparatus on which the client application program is to be installed (hereinafter, referred to as an "installation-target image forming apparatus" in the description of the operation illustrated in FIG. 11) is designated from among the image forming apparatuses indicated in the device management information 44*c*, whether the installation-target image forming apparatus is designated from among the image forming apparatuses indicated in the device management information 44*c* (S221). Here, the application installation unit 45*c* may designate a plurality of image forming apparatuses among the image forming apparatuses indicated in the device management information 44*c* as the installation-target image forming apparatus. Further, if a group indicated in the device management information 44*c* is designated, the application installation unit 45*c* may designate all the image forming apparatuses belonging to the group as the installation-target image forming apparatus. It is possible for the administrator to designate the installation-target image forming apparatus to the administrator terminal 40 via the operation unit 41.

If determining in S221 that an installation-target image forming apparatus is designated from among image forming apparatuses indicated in the device management information 44*c*, the application installation unit 45*c* determines, until it is determined that either one of the authentication and authorization utilization type client application package 44*d* or the authentication and authorization non-utilization type client application package 44*e* is designated as the installation package of the client application program to be installed on the installation-target image forming apparatus which is determined to be designated in S221, whether either one of the authentication and authorization utilization type client application package 44*d* or the authentication and authorization non-utilization type client application package 44*e* is designated (S222). It is possible for the administrator to designate either one of the authentication and authorization utilization type client application package 44*d* or the authentication or authorization non-utilization type client application package 44*e*, to the administrator terminal 40 via the operation unit 41, as the installation package of the client application program to be installed in the installation-target image forming apparatus.

If determining in S222 that either one of the authentication and authorization utilization type client application package 44*d* or the authentication and authorization non-utilization type client application package 44*e* is designated, the application installation unit 45*c* determines whether it is indicated in the authentication and authorization utilization presence-or-absence information 44*b* that the function of the authentication and authorization system 60 is utilized (S223).

If determining in S223 that it is indicated in the authentication and authorization utilization presence-or-absence information 44*b* that the function of the authentication and authorization system 60 is utilized, the application installation unit 45c determines whether the authentication and authorization utilization type client application package 44d is designated as the installation package of the client application program to be installed on the installation-target image forming apparatus (S224).

If determining in S224 that the authentication and authorization utilization type client application package 44d is designated, the application installation unit 45c installs the authentication and authorization utilization type client application on the installation-target image forming apparatus by the authentication and authorization utilization type client application package 44d (S225).

Next, the application installation unit 45c updates the device setting information of the installation-target image forming apparatus with a setting value indicated in the authentication and authorization utilization setting value information 44f (S226).

If determining in S223 that it is not indicated in the authentication and authorization utilization presence-or-absence information 44b that the function of the authentication and authorization system 60 is utilized, that is, it is indicated in the authentication and authorization utilization presence-or-absence information 44b that the function of the authentication and authorization system 60 is not utilized, the application installation unit 45c determines whether the authentication and authorization non-utilization type client application package 44e is designated as the installation package of the client application program to be installed on the installation-target image forming apparatus (S227).

If determining in S227 that the authentication and authorization non-utilization type client application package 44e is designated, the application installation unit 45c installs the authentication and authorization non-utilization type client application on the installation-target image forming apparatus by the authentication and authorization non-utilization type client application package 44e (S228).

Next, the application installation unit 45c updates the device setting information of the installation-target image forming apparatus with a setting value indicated in the authentication and authorization non-utilization setting value information 44g (S229).

If the processing in S226 or S229 ends, the application installation unit 45c displays the success or failure of the installation of the client application program, and the success or failure of the update of the device setting information on the display unit 42 for each installation-target image forming apparatus (S230), and the operation illustrated in FIG. 11 ends.

If determining in S224 that the authentication and authorization utilization type client application package 44d is not designated, that is, the authentication and authorization non-utilization type client application package 44e is designated, or determining in S227 that the authentication and authorization non-utilization type client application package 44e is not designated, that is, the authentication and authorization utilization type client application package 44d is designated, the application installation unit 45c displays, on the display unit 42, an indication that the installation of the client application program on the installation-target image forming apparatus has failed because the designation of the installation package of the client application program is inappropriate (S231), and the operation illustrated in FIG. 11 ends.

Next, an operation of the administrator terminal 40 when layout information is generated will be described.

Figure 12:
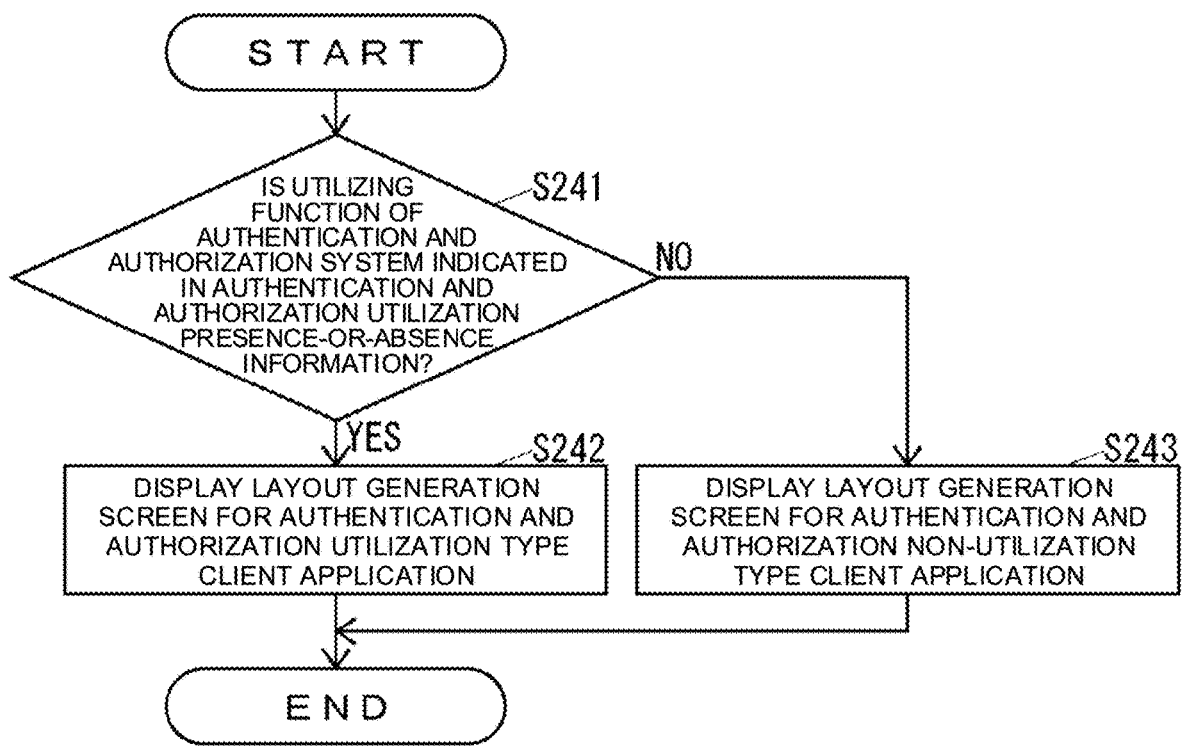
FIG. 12 is a flowchart of an operation of the administrator terminal illustrated in FIG. 5 when a layout generation screen for generating layout information is displayed.

FIG. 12 is a flowchart of an operation of the administrator terminal 40 when a layout generation screen for generating layout information is displayed.

If being instructed via the operation unit 41 to display the layout generation screen, the layout generation unit 45d of the administrator terminal 40 executes the operation illustrated in FIG. 12.

As illustrated in FIG. 12, the layout generation unit 45d determines whether it is indicated in the authentication and authorization utilization presence-or-absence information 44b that the function of the authentication and authorization system 60 is utilized (S241).

If determining in S241 that it is indicated in the authentication and authorization utilization presence-or-absence information 44b that the function of the authentication and authorization system 60 is utilized, the layout generation unit 45d displays, on the display unit 42, an authentication and authorization utilization type client application layout generation screen 110 (see FIG. 13) being a layout generation screen for generating a screen layout of the authentication and authorization utilization type client application (S242), and the operation illustrated in FIG. 12 ends.

Figure 13:
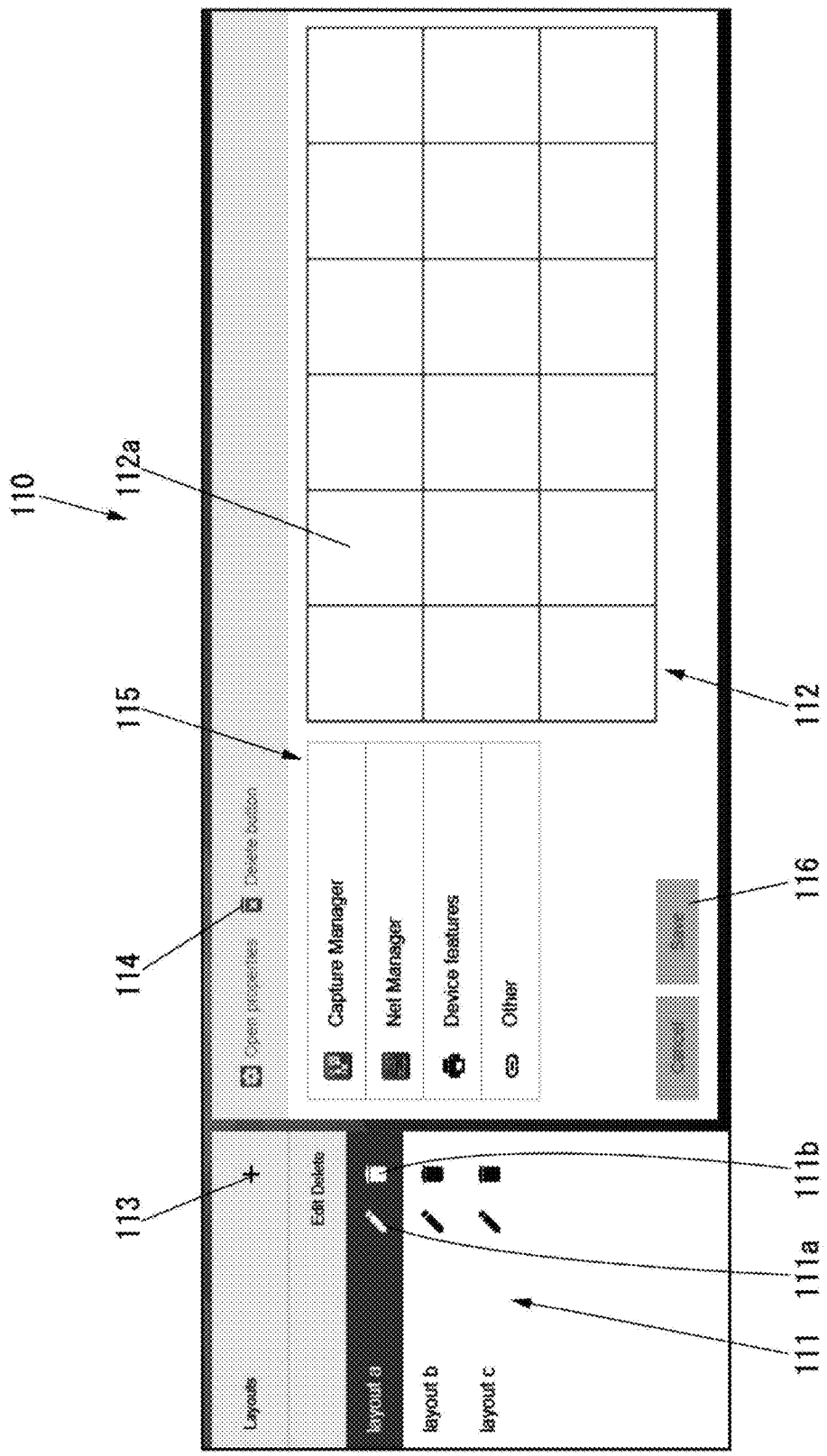
FIG. 13 is a graphic representation illustrating an example of an authentication and authorization utilization type client application layout generation screen displayed in the operation illustrated in FIG. 12.

FIG. 13 is a graphic representation illustrating an example of the authentication and authorization utilization type client application layout generation screen 110.

The authentication and authorization utilization type client application layout generation screen 110 illustrated in FIG. 13 includes a layout list area 111 for displaying a list of application screen layouts; a layout display area 112 for displaying a layout designated in the layout list area 111; a layout addition button 113 for adding a layout displayed in the layout list area 111; a button deletion button 114 for deleting a button designated via the operation unit 41 from among buttons displayed in the layout display area 112; a button display area 115 where buttons to be arranged in the layout display area 112 are indicated; and a save button 116 for updating layout information of the layout designated in the layout list area 111 with a layout displayed in the layout display area 112.

In the example illustrated in FIG. 13, the layout list area 111 includes three layouts, namely "layout a", "layout b", and "layout c".

The layout list area 111 includes, for all the layouts, an edit button 111a for changing a name of the corresponding layout, and a layout deletion button 111b for deleting the corresponding layout. If the edit button 111a is depressed and a name of the layout for which the edit button 111a is depressed is changed via the operation unit 41, the layout generation unit 45d changes the name of the layout in the layout information of the layout. If the layout deletion button 111b is depressed, the layout generation unit 45d deletes the layout for which the layout deletion button 111b is depressed from the layout list area 111, and also deletes the layout information of the layout from the storage unit 44.

If the layout addition button 113 is depressed, the layout generation unit 45d adds a new layout to the layout list area 111, and also adds the layout information of the layout to the storage unit 44.

Figure 14:
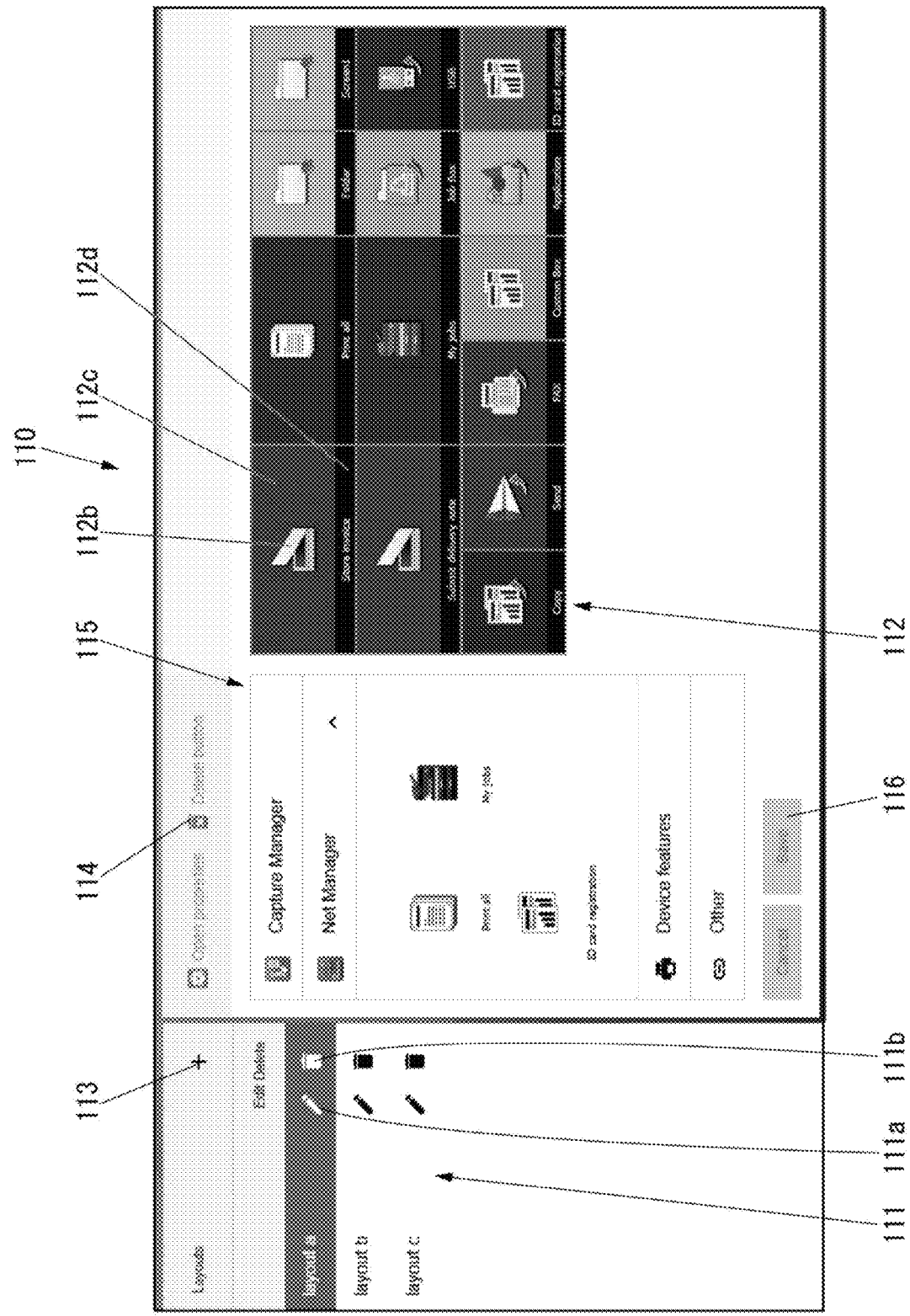
FIG. 14 is a graphic representation illustrating an example of an authentication and authorization utilization type client application layout generation screen in an example different from an example illustrated in FIG. 13.

In the example illustrated in FIG. 13, the layout display area 112 includes a total of 18 squares 112a having six squares for each row and three squares for each column. If a button displayed in the button display area 115 is dragged-and-dropped to the layout display area 112, the layout generation unit 45d copies the button from the button display area 115 to the layout display area 112. As illustrated in FIG. 14, the button displayed in the layout display area 112 includes an image 112b of an icon in the button, a background area 112c of the icon in the button, and a name area 112d for displaying a name of the button.

If a button copied from the button display area 115 to the layout display area 112 is a button for executing the document processing flow (hereinafter, referred to as a "flow execution button"), the layout generation unit 45d executes the operation illustrated in FIG. 15 for associating the document processing flow saved in the document processing flow execution system 50 with the flow execution button copied from the button display area 115 to the layout display area 112.

Figure 15:
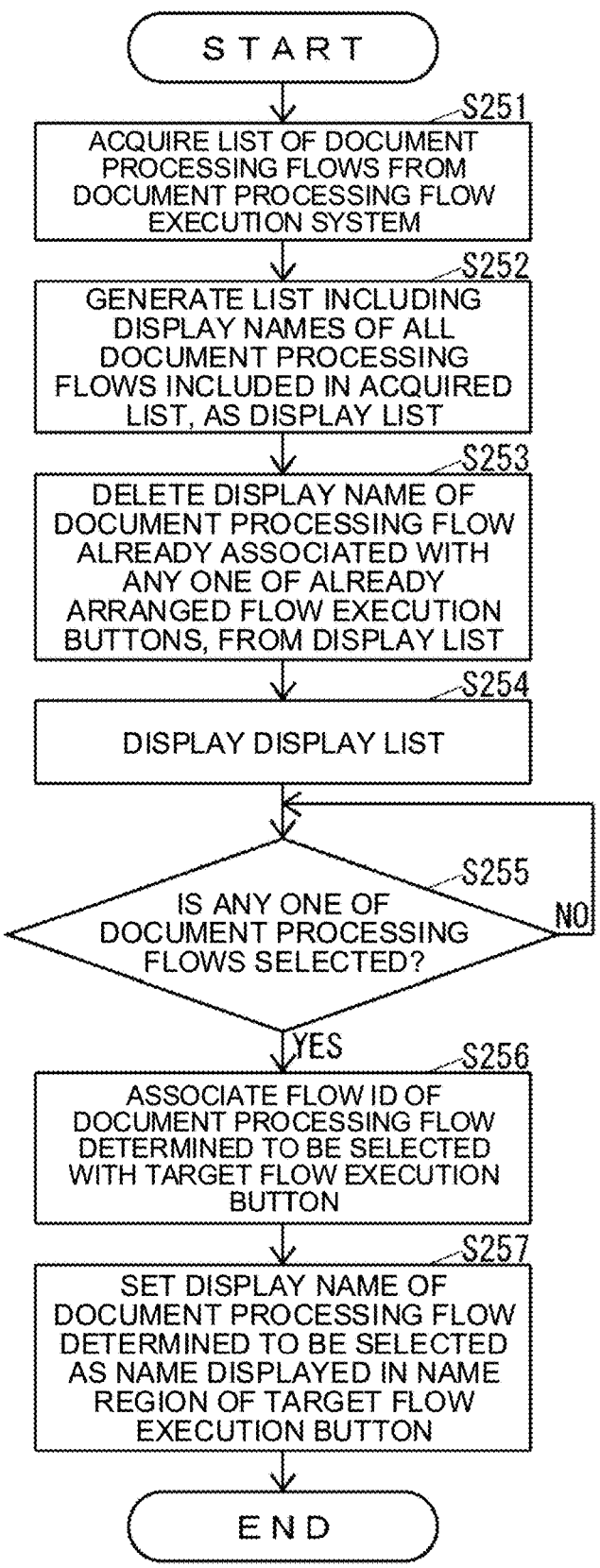
FIG. 15 is a flowchart of an operation of the administrator terminal illustrated in FIG. 5 when a document processing flow is associated with a flow execution button.

FIG. 15 is a flowchart of an operation of the administrator terminal 40 when the document processing flow is associated with a flow execution button.

As illustrated in FIG. 15, the layout generation unit 45d acquires, from the document processing flow execution system 50, a list of document processing flows saved in the document processing flow execution system 50 (S251). The list acquired in S251 includes a display name and a flow ID for each document processing flow.

After the processing in S251, the layout generation unit 45d generates a list including display names of all document processing flows included in the list acquired in S251 as a display list being a list of the document processing flows for displaying the list on the display unit 42 (S252).

Next, the layout generation unit 45d deletes a display name of a document processing flow already associated with any of flow execution buttons already arranged in the layout display area 112 from the display list generated in S252 (S253).

Next, the layout generation unit 45d displays the current display list on the display unit 42 (S254). Therefore, it is possible for the administrator to select any one of the document processing flows included in the display list being displayed on the display unit 42 via the operation unit 41.

After the processing in S254, the layout generation unit 45d determines, until it is determined that any one of the document processing flows included in the display list displayed on the display unit 42 is selected, whether any one of the document processing flows included in the display list displayed on the display unit 42 is selected (S255).

If determining in S255 that any one of the document processing flows included in the display list displayed on the display unit 42 is selected, the layout generation unit 45d associates a flow ID of the document processing flow which is determined to be selected in S255 with the flow execution button associated with the document processing flow (S256).

It is noted that if the screen of the client application program is displayed on the display unit of the image forming apparatus, then when the flow execution buttons are included on the screen of the client application program, the control unit of the image forming apparatus transmits, to the document processing flow execution system 50, as a result of depressing any of the flow execution buttons included on the screen of the client application program via the operating unit, the flow ID associated with the depressed flow execution button. Therefore, the control unit 55 of the document processing flow execution system 50 is capable of executing the document processing flow identified by the flow ID transmitted from the image forming apparatus.

After the processing in S256, the layout generation unit 45d sets the display name of the document processing flow determined to be selected in S255 to the name to be displayed in the name area 112d of the flow execution button associated with the document processing flow (S257), and the operation illustrated in FIG. 15 ends.

In the example illustrated in FIG. 14, the button displayed as "Store invoice" in the name area 112d, and the button displayed as "Submit delivery note" in the name area 112d are flow execution buttons.

As illustrated in FIG. 14, the layout generation unit 45d arranges buttons with aligning to the squares 112a in the layout display area 112 (see FIG. 13). If a button is dragged-and-dropped on the layout display area 112, the layout generation unit 45d changes a position of the button on the button display area 115. If an end of a button is dragged-and-dropped on the layout display area 112, the layout generation unit 45d changes the size of the button on the button display area 115.

If a button is, for example, double-clicked on the layout display area 112, the layout generation unit 45d displays a menu for customizing the button on the display unit 42. Examples of items included in the menu for customizing the button include an item for changing the image 112b of the button, an item for changing a color of the background area 112c of the button, and an item for changing a name displayed in the name area 112d of the button. In addition, if the button is a flow execution button, then the items included in the menu for customizing the button include a flow association item being an item for changing the document processing flow associated with the flow execution button. An operation when the flow association item is selected is similar to the operation illustrated in FIG. 15.

If a dictionary indicating a name displayed in the name area 112d for each language is included in the layout information, it is possible to automatically change the name displayed in the name area 112d displayed on the display unit of the image forming apparatus in response to a change in the display language in the image forming apparatus if the layout information is installed on the image forming apparatus.

If the button deletion button 114 is depressed, the layout generation unit 45d deletes the designated button among the buttons displayed in the layout display area 112.

The button display area 115 illustrated in FIG. 13 includes, as items to which the buttons to be arranged in the layout display area 112 belong, "Capture Manager" being an item for providing to a user a function of the document processing flow execution system 50, "Net Manager" being an item for providing to a user a function of the authentication and authorization system 60, "Device features" being an item for providing to a user a function of the image forming apparatus, and "Other" being an item to which the other buttons belong.

For example, if the "Net Manager" item in the button display area 115 is depressed, the layout generation unit 45d displays buttons belonging to the "Net Manager" item in the button display area 115, as illustrated in FIG. 14. In the example illustrated in FIG. 14, the buttons belonging to the "Net Manager" item includes "Print all" being a button for printing all print data spooled in the authentication and authorization system 60 in association with a user logged in to the image forming apparatus, "My jobs" being a button for printing print data selected by a user from print data spooled in the authentication and authorization system 60 in association with the user logged in to the image forming apparatus, and "ID card registration" being a button for registering an ID card used for user authentication.

A case where the "Net Manager" item in the button display area 115 is depressed is described above, however, even if the "Capture Manager" item, the "Device features" item, or the "Other" item in the button display area 115 is depressed, the layout generation unit 45d similarly displays buttons belonging to each of the items in the button display area 115.

If the save button 116 is operated, the layout generation unit 45d updates the layout information of the layout designated in the layout list area 111 with the layout displayed in the layout display area 112, and various types of information such as flow IDs associated with buttons in the layout.

As illustrated in FIG. 12, If determining in S241 that it is not indicated in the authentication and authorization utilization presence-or-absence information 44b that the function of the authentication and authorization system 60 is utilized, that is, it is indicated in the authentication and authorization utilization presence-or-absence information 44b that the function of the authentication and authorization system 60 is not utilized, the layout generation unit 45d displays, on the display unit 42, an authentication and authorization non-utilization type client application layout generation screen 120 (see FIG. 16) as a layout generation screen for generating a screen layout of the authentication and authorization non-utilization type client application (S243), and the operation illustrated in FIG. 12 ends.

Figure 16:
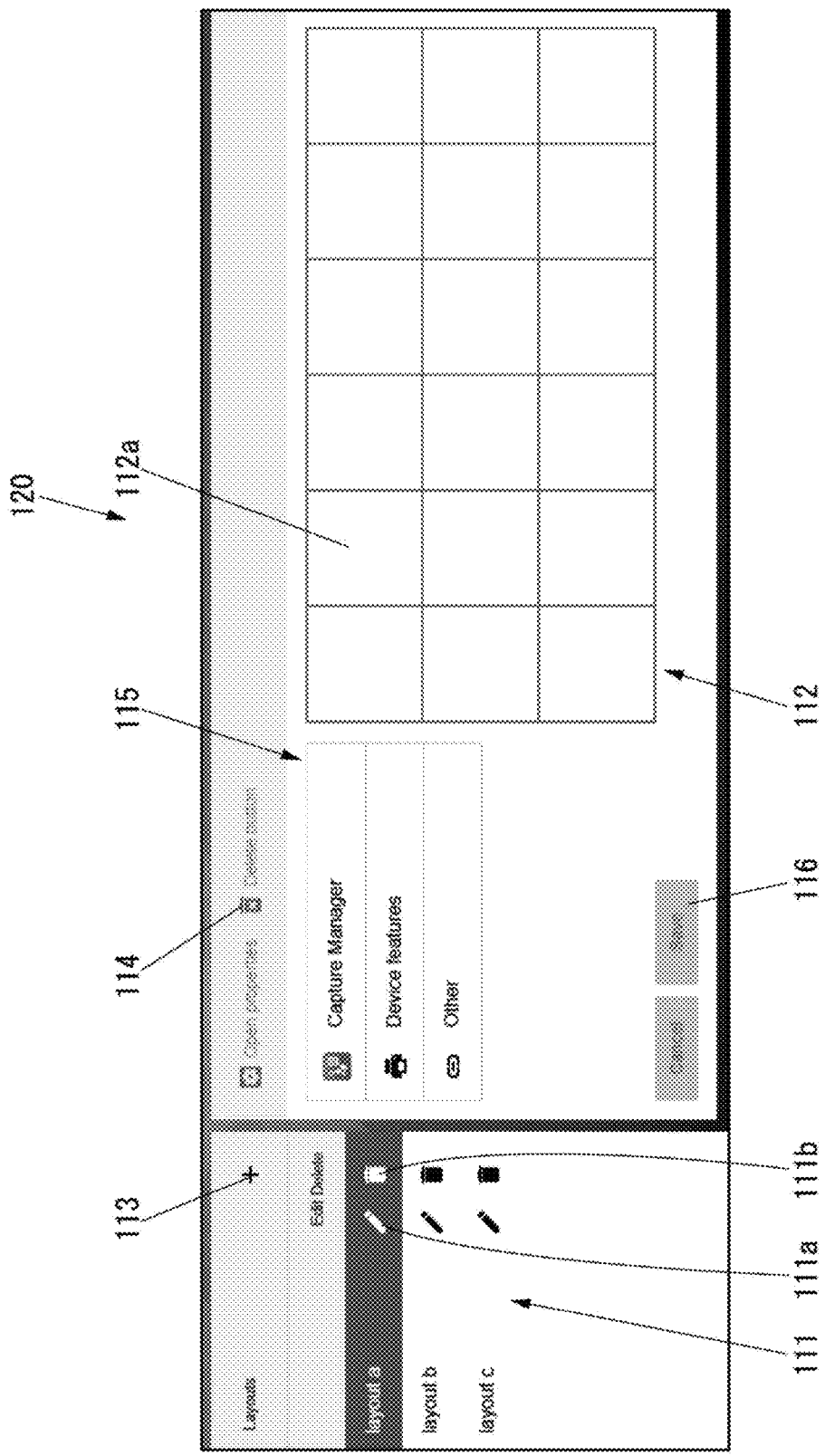
FIG. 16 is a graphic representation illustrating an example of an authentication and authorization non-utilization type client application layout generation screen displayed in the operation illustrated in FIG. 12.

FIG. 16 is a graphic representation illustrating an example of the authentication and authorization non-utilization type client application layout generation screen 120.

The configuration of the authentication and authorization non-utilization type client application layout generation screen 120 illustrated in FIG. 16 is similar to the configuration in which the authentication and authorization utilization type client application layout generation screen 110 (see FIG. 13) does not include the "Net Manager" item in the button display area 115.

Next, an operation of the administrator terminal 40 when the layout information is installed on the image forming apparatus will be described.

Figure 17:
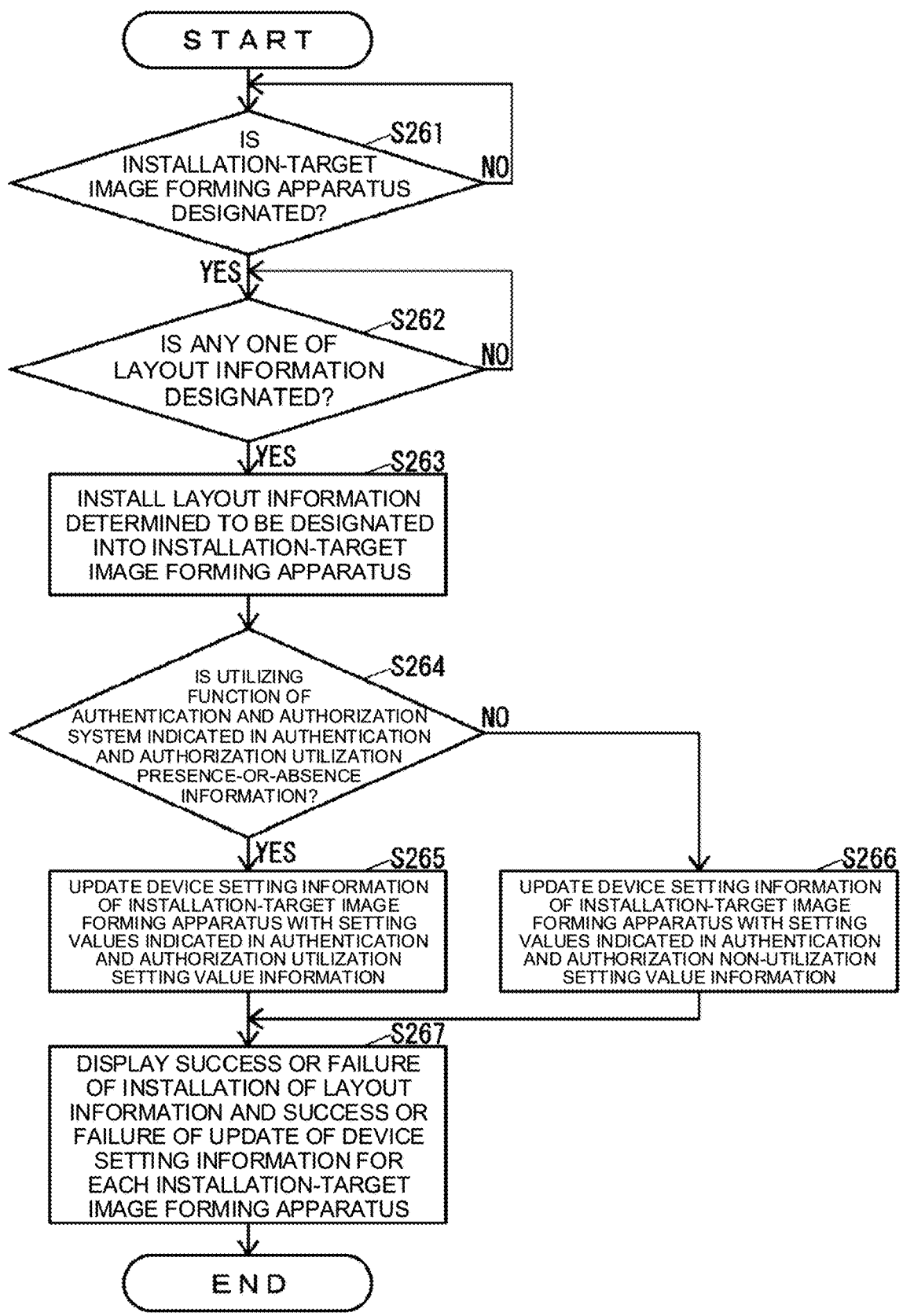
FIG. 17 is a flowchart of an operation of the administrator terminal illustrated in FIG. 5 when layout information is installed on the image forming apparatus.

FIG. 17 is a flowchart of an operation of the administrator terminal 40 when the layout information is installed on the image forming apparatus.

If being instructed via the operation unit 41 to start a process of installing the layout information on the image forming apparatus, the layout installation unit 45e of the administrator terminal 40 executes the operation illustrated in FIG. 17.

As illustrated in FIG. 17, the layout installation unit 45e determines, until it is determined that an image forming apparatus on which the layout information is to be installed (hereinafter, referred to as an "installation-target image forming apparatus" in the description of the operation illustrated in FIG. 17) is designated from among the image forming apparatuses indicated in the device management information 44c, whether the installation-target image forming apparatus is designated from among the image forming apparatuses indicated in the device management information 44c (S261). Here, the layout installation unit 45e may designate a plurality of image forming apparatuses among the image forming apparatuses indicated in the device management information 44c as the installation-target image forming apparatus. Further, if a group indicated in the device management information 44c is designated, the layout installation unit 45e may designate all the image forming apparatuses belonging to the group as the installation-target image forming apparatus. It is possible for the administrator to designate the installation-target image forming apparatus to the administrator terminal 40 via the operation unit 41.

If determining in S261 that the installation-target image forming apparatus is designated from among the image forming apparatuses indicated in the device management information 44c, the layout installation unit 45e determines, until it is determined that any one of the layout information stored in the storage unit 44 is designated as the layout information to be installed on the installation-target image forming apparatus which is determined to be designated in S261, whether any one of the layout information stored in the storage unit 44 is designated (S262). It is possible for the administrator to designate any one of the layout information stored in the storage unit 44, to the administrator terminal 40 via the operation unit 41, as the layout information to be installed on the installation-target image forming apparatus.

If determining in S262 that any one of the layout information stored in the storage unit 44 is designated, the layout installation unit 45e installs the layout information which is determined to be designated in S262 on the installation-target image forming apparatus (S263).

Next, the layout installation unit 45e determines whether it is indicated in the authentication and authorization utilization presence-or-absence information 44b that the function of the authentication and authorization system 60 is utilized (S264).

If determining in S264 that it is indicated in the authentication and authorization utilization presence-or-absence information 44b that the function of the authentication and authorization system 60 is utilized, the layout installation unit 45e updates the device setting information of the installation-target image forming apparatus with a setting value indicated in the authentication and authorization utilization setting value information 44f (S265).

If determining in S264 that it is not indicated in the authentication and authorization utilization presence-or-absence information 44b that the function of the authentication and authorization system 60 is utilized, that is, it is indicated in the authentication and authorization utilization presence-or-absence information 44b that the function of the authentication and authorization system 60 is not utilized, the layout installation unit 45e updates the device setting information of the installation-target image forming apparatus with a setting value indicated in the authentication and authorization non-utilization setting value information 44g (S266).

If the processing in S265 or S266 ends, the layout installation unit 45e displays the success or failure of the installation of the layout information, and the success or failure of the update of the device setting information on the display unit 42 for each installation-target image forming apparatus (S267), and the operation illustrated in FIG. 17 ends.

Next, an operation of the image forming apparatus 20 when the screen of the client application program is displayed according to the layout information 27b will be described.

Figure 18:
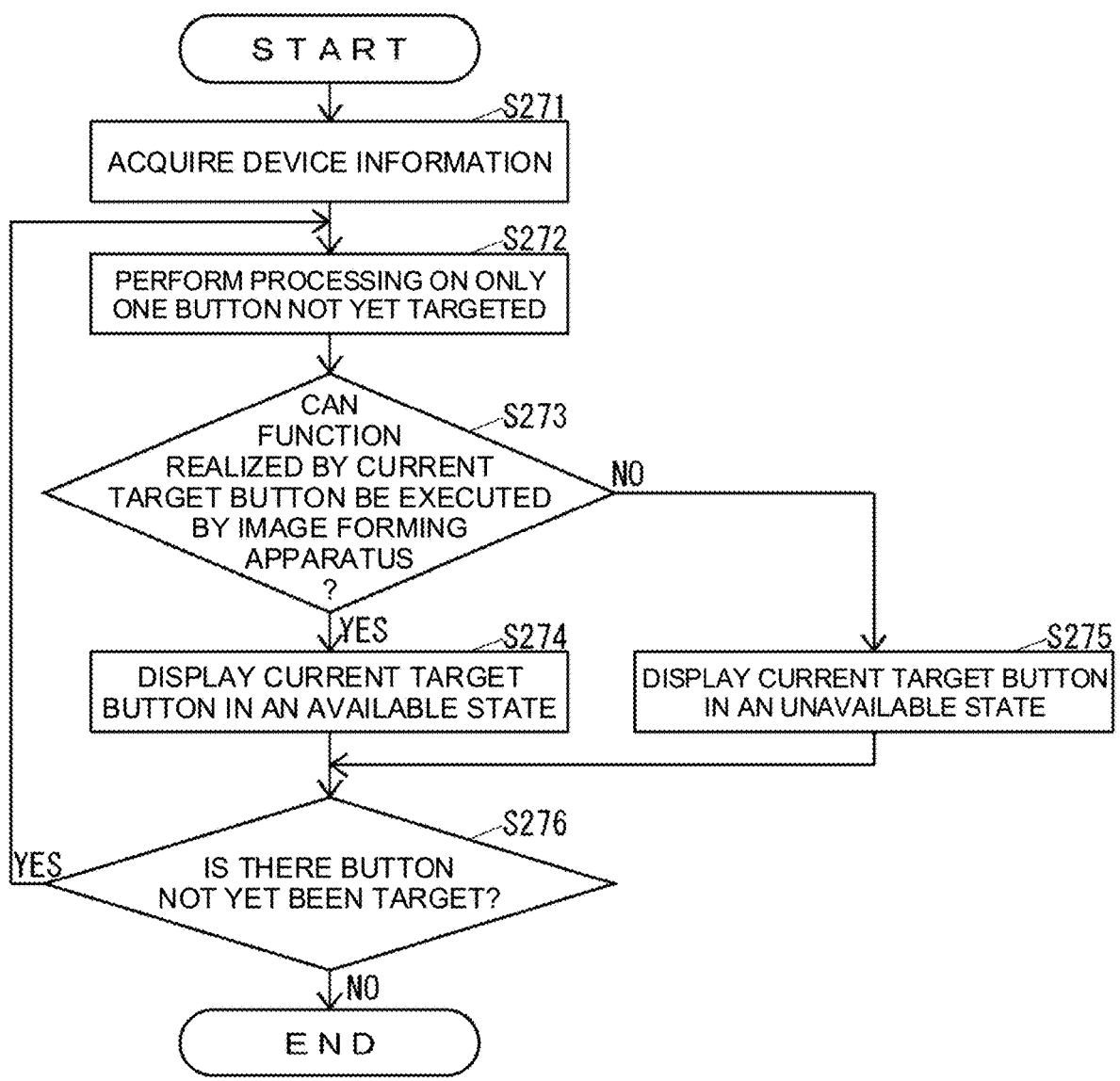
FIG. 18 is a flowchart of an operation of the image forming apparatus illustrated in FIG. 3 when a screen of an authentication and authorization utilization type client application is displayed according to the layout information.

FIG. 18 is a flowchart of an operation of the image forming apparatus 20 when the screen of the authentication and authorization utilization type client application 27a is displayed according to the layout information 27b.

If the authentication and authorization utilization type client application 27a is installed on the image forming apparatus 20, the control unit 28 of the image forming apparatus 20 executes the authentication and authorization utilization type client application 27a to execute the operation illustrated in FIG. 18.

As illustrated in FIG. 18, the control unit 28 of the image forming apparatus 20 acquires various types of information (hereinafter referred to as "device information") such as the model of the image forming apparatus 20 and the current state thereof (S271).

Next, the control unit 28 targets only one button not yet targeted in the current operation illustrated in FIG. 18 among buttons indicated in the layout information 27b installed on the image forming apparatus 20 (S272).

Next, the control unit 28 determines whether it is possible to execute a function realized by the current target button in the image forming apparatus 20, based on the device information acquired in S271, and the authorization information of a user acquired from the authentication and authorization system 60 when the user logged in to the image forming apparatus 20 (S273).

If determining in S273 that it is possible to execute the function realized by the current target button in the image forming apparatus 20, the control unit 28 displays the current target button on the display unit 22 in an enabled state (S274).

If determining in S273 that it is not possible to execute the function realized by the current target button in the image forming apparatus 20, the control unit 28 displays the current target button on the display unit 22 in a disabled state, for example, in a grayed-out state (S275).

After the processing in S274 or S275, the control unit 28 determines whether there is any button not yet targeted in the current operation illustrated in FIG. 18 among the buttons indicated in the layout information 27b (S276).

If determining in S276 that there is a button not yet targeted in the current operation illustrated in FIG. 18 among the buttons indicated in the layout information 27b, the control unit 28 executes the processing in S272.

If the control unit 28 determines in S276 that there is no button not yet targeted in the current operation illustrated in FIG. 18 among the buttons indicated in the layout information 27b, the operation illustrated in FIG. 18 ends.

The operation of the image forming apparatus 20 when the screen of the authentication and authorization non-utilization type client application 27d is displayed according to the layout information 27b is similar to the operation illustrated in FIG. 18 except for the point that the information resulting in the determination in S273 is only the device information acquired in S271.

Figure 19:
FIG. 19 is a graphic representation illustrating an example of a screen of the client application program displayed on the display unit illustrated in FIG. 3.

FIG. 19 is a diagram illustrating an example of a screen 130 of the client application program displayed on the display unit 22.

On the screen 130 illustrated in FIG. 19, buttons with a name displayed in the name area being any one of "Low quota", "Folder", "Submit delivery note", "FAX", and "Application" are displayed in a disabled state. Therefore, a user is able to visually recognize that the buttons are unavailable. Further, even if the buttons are depressed, the control unit 28 of the image forming apparatus 20 does not execute the functions realized by the buttons.

As described above, if the flow execution button is arranged in the layout of the screen of the client application program of the image forming apparatus, the administrator terminal 40 acquires a list of the document processing flows from the document processing flow execution system 50 (S251), displays at least a part of the document processing flows included in the list acquired in S251, on the display unit 42 (S252 to S254), and associates the document processing flow selected via the operation unit 41 from among the document processing flows displayed on the display unit 42 with a flow execution button (S255 to S256), and therefore, it is possible to simplify addition of buttons executing the document processing flow in the document processing flow execution system 50, on a screen of the image forming apparatus.

The administrator terminal 40 displays a workflow included in the list acquired from the document processing flow execution system 50 in S251 on the display unit 42 in a state where the document processing flow already associated with the flow execution button already arranged in the layout is excluded (S252 to S254), and therefore, it is possible to prevent addition of a plurality of buttons executing the same document processing flow in the document processing flow execution system 50, on the same screen of the image forming apparatus.

If the layout information is installed on the image forming apparatus in S263, the administrator terminal 40 updates the device setting information of the image forming apparatus with the setting value indicated in the authentication and authorization utilization setting value information 44f (S265), or with the setting value indicated in the authentication and authorization non-utilization setting value information 44g (S266), and therefore, it is possible to reduce the work load of updating the device setting information of the image forming apparatus.

If it is indicated in the authentication and authorization utilization presence-or-absence information 44b that the function of the authentication and authorization system 60 is utilized (YES in S264), the administrator terminal 40 updates the device setting information of the image forming apparatus with the setting value indicated in the authentication and authorization utilization setting value information 44f (S265), and if it is indicated in the authentication and authorization utilization presence-or-absence information 44b that the function of the authentication and authorization system 60 is not utilized (NO in S264), the administrator terminal 40 updates the device setting information of the image forming apparatus with the setting value indicated in the authentication and authorization non-utilization setting value information 44g (S266), and therefore, it is possible to appropriately update the device setting information of the image forming apparatus.

As described above, it is possible to designate the setting value indicated in the device setting information of the image forming apparatus from a system menu of the image forming apparatus. Therefore, the setting value indicated in the device setting information of the image forming apparatus may be changed to an inappropriate value by a user. However, when the layout information is installed on the image forming apparatus in S263, the administrator terminal 40 may update the device setting information of the image forming apparatus to appropriate information (S265 or S266).

The administrator terminal 40 may install the same layout information on a plurality of image forming apparatuses in a batch (S261 to S263), and therefore, it is possible to improve convenience.

The administrator terminal 40 may change the image 112b of an icon in the button, a color of the background area 112c in the button, and a name displayed in the name area 112d in the button, from a default state, and therefore, it is possible to customize the screens of the image forming apparatus so that a user can easily use it.

What is claimed is:

1. An appliance setting apparatus comprising:
   a display device;
   an operation device; and
   a processor configured to generate layout information indicating a layout of a screen of an application program for providing, by an electronic appliance, a function of a workflow execution system to execute a workflow, and install the layout information generated by the processor in the electronic appliance, wherein the processor generates the layout information so that a button for realizing a function executed by the electronic appliance is arranged in the layout, and wherein, if the button to be arranged in the layout is a flow execution button for executing the workflow and the workflow includes a plurality of workflows, the processor acquires a list of workflows from the workflow execution system, displays, on the display device, a specific workflow of the list acquired, and generates the layout information by associating a workflow selected via the operation device from the workflows displayed on the display device with the flow execution button.

2. The appliance setting apparatus according to claim 1, wherein the flow execution button includes a plurality of flow execution buttons, and the processor displays the workflows included in the list on the display device in a state where a workflow already associated with any flow execution button already arranged in the layout is excluded.

3. The appliance setting apparatus according to claim 1, wherein the electronic appliance stores device setting information indicating a setting value of a setting item of the electronic appliance, wherein the appliance setting apparatus includes a storage device configured to store setting value information indicating a setting value applied to the device setting information, and wherein, when installing the layout information on the electronic appliance, the processor updates the device setting information of the electronic appliance with the setting value indicated in the setting value information stored in the storage device.

4. The appliance setting apparatus according to claim 3, wherein the storage device stores authentication and authorization utilization presence-or-absence information indicating presence or absence of a utilization of a function of an authentication and authorization system to authenticate and authorize a user, wherein the storage device stores, as the setting value information, authentication and authorization utilization setting value information indicating a setting value suitable for the electronic appliance to utilize the function of the authentication and authorization system, and authentication and authorization non-utilization setting value information indicating a setting value suitable for the electronic appliance not to utilize the function of the authentication and authorization system, and wherein the processor:

updates the device setting information with the setting value indicated in the authentication and authorization utilization setting value information if the authentication and authorization utilization presence-or-absence information indicates that the function of the authentication and authorization system is utilized; and updates the device setting information with the setting value indicated in the authentication and authorization non-utilization setting value information if the authentication and authorization utilization presence-or-absence information indicates that the function of the authentication and authorization system is not utilized.

5. The appliance setting apparatus according to claim 1, wherein the processor installs identical layout information on a plurality of electronic appliances in a batch.

6. The appliance setting apparatus according to claim 1, wherein the processor is able to change at least one of an image of an icon in the button, a color of a background area of the icon in the button, and a name of the button displayed in a name area for displaying the name in the button, from a default state.

7. A non-transitory computer-readable recording medium storing an appliance setting program executed by a computer including a display device and an operation device, the appliance setting program causing the computer to implement:

a layout generation unit to generate layout information indicating a layout of a screen of an application program for providing, by an electronic appliance, a function of a workflow execution system to execute a workflow; and a layout installation unit to install the layout information generated by the layout generation unit in the electronic appliance, wherein the layout includes a button for realizing a function executed by the electronic appliance is arranged in the layout, and wherein, if the button to be arranged in the layout is a flow execution button for executing the workflow and the workflow includes a plurality of workflows, the layout generation unit acquires a list of workflows from the workflow execution system, displays, on the display device, a specific workflow of the list acquired, and generates the layout information by associating a workflow selected via the operation device from the workflows displayed on the display device with the flow execution button.

8. The appliance setting apparatus according to claim 1, wherein the electronic appliance is an image forming apparatus designated via the operation device.

* * * * *